United States Patent [19]

Iwashita et al.

[11] Patent Number: 5,534,956
[45] Date of Patent: Jul. 9, 1996

[54] PRINT CONTROL APPARATUS FOR EFFECTIVE MULTIPLE PRINTING OF IMAGES ONTO A COMMON PRINTING FRAME

[75] Inventors: Tomonori Iwashita, Yokohama; Akira Egawa, Machida; Yoshiaki Sugiyama, Tokyo, all of Japan

[73] Assignee: Canon Kabushiki Kaisha, Tokyo, Japan

[21] Appl. No.: 337,193

[22] Filed: Nov. 7, 1994

Related U.S. Application Data

[63] Continuation of Ser. No. 829,381, Feb. 3, 1992, abandoned, which is a continuation of Ser. No. 681,637, Apr. 4, 1991, Pat. No. 5,086,310, which is a continuation of Ser. No. 455,784, Jan. 2, 1990, abandoned, which is a continuation of Ser. No. 349,528, May 5, 1989, abandoned.

[30] Foreign Application Priority Data

| May 9, 1988 | [JP] | Japan | 63-113275 |
| Jun. 27, 1988 | [JP] | Japan | 63-159781 |
| Jun. 27, 1988 | [JP] | Japan | 63-159782 |
| Sep. 16, 1988 | [JP] | Japan | 63-231937 |

[51] Int. Cl.⁶ ............................. G03B 29/00
[52] U.S. Cl. ............................. 354/76; 354/106
[58] Field of Search ............................. 354/75, 76, 106; 355/40, 41

[56] References Cited

U.S. PATENT DOCUMENTS

| 4,352,555 | 10/1982 | Dodds et al. | 355/77 |
| 4,361,388 | 11/1982 | Mlcak et al. | 354/106 |
| 4,723,141 | 2/1988 | Hamada et al. | 354/105 |
| 4,786,944 | 11/1988 | Sakamoto et al. | 355/20 |
| 4,797,713 | 1/1989 | Terashita et al. | 355/77 |
| 4,811,042 | 3/1989 | Cloutier et al. | 354/410 |
| 4,812,871 | 3/1989 | Taniguchi et al. | 354/421 |
| 4,860,039 | 8/1989 | Hata et al. | 354/106 |
| 5,086,310 | 2/1992 | Iwashita et al. | 354/75 |

*Primary Examiner*—David M. Gray
*Attorney, Agent, or Firm*—Fitzpatrick, Cella, Harper & Scinto

[57] ABSTRACT

A print control apparatus in a camera includes a camera provided with setting means for setting multiple printing information and recording means for recording the multiple printing information set by the setting means, or a printing apparatus provided with reading means for reading the multiple printing information recorded by the recording means and control means for effecting multiple printing in conformity with the multiple printing information read by the reading means.

64 Claims, 22 Drawing Sheets

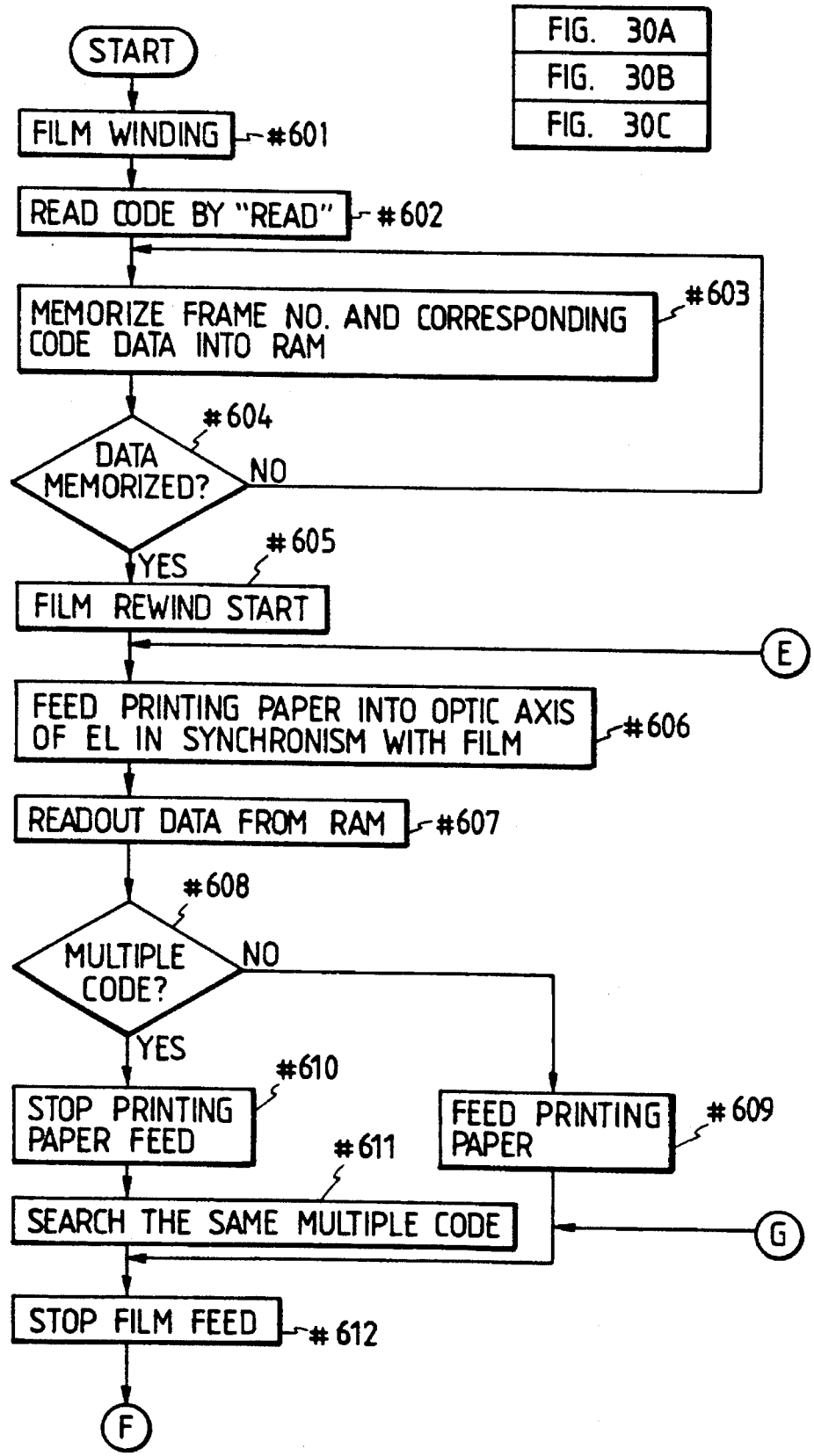

PRINT CONTROL APPARATUS FOR EFFECTIVE MULTIPLE PRINTING OF IMAGES ONTO A COMMON PRINTING FRAME

This application is a continuation of application Ser. No. 07/829,381, filed Feb. 3, 1992, now abandoned, which is a continuation application under 37 C.F.R. 1.60 of Ser. No. 07/681,637, filed Apr. 4, 1991, which issued as U.S. Pat. No. 5,086,310 on Feb. 4, 1992, which is a continuation application of Ser. No. 07/455,784, filed Jan. 2, 1990, now abandoned, which is a continuation application of Ser. No. 07/349,528, filed May 5, 1989, now abandoned.

BACKGROUND OF THE INVENTION

1. Field of the Invention

This invention relates to a print control apparatus for photographic film or the like, and more particularly to a print control apparatus in which a plurality of frames of a photographed film or the like are printed on a sheet of printing paper, whereby an effect similar to that obtained by effecting multiple exposure in a camera can be obtained.

2. Related Background Art

Multiple photographing mechanisms have heretofore been provided in some of single-lens reflex cameras of which many kinds of specifications are required, but it has scarcely been practiced chiefly for the following reasons to incorporate the multiple photographing function into a lens shutter camera designed with the compactness and economy of the camera as a primary object. In a lens shutter camera, film winding-up and shutter charge can be effected at a time or in association with each other and therefore, there can be realized a compact, light-weight and highly economical camera, but if an attempt is made to endow, for example, a full automatic lens shutter camera having an auto focus mechanism with the multiple photographing function, it becomes necessary that film winding-up and shutter charge and charging of the auto focus mechanism be effected discretely, and this results in the remarkable complication, bulkiness and increased cost of the camera, which in turn has resulted in a loss of compactness of economy which are merits intrinsic to a lens shutter camera. Therefore, there have scarcely been realized lens shutter cameras capable of multiple photographing.

Also, when multiple photographing is to be effected, various judgments must be formed during photographing, such as changing the exposure per one cycle of photographing depending on the number of cycles of multiple photographing, and keeping the exposure as it is when the background is dark, and it has been impossible to effect multiple photographing readily. Further, during multiple photographing, one mistake has affected printing results.

SUMMARY OF THE INVENTION

The present invention has been made in view of the above-noted circumstances, and intends to provide a camera provided with setting means for setting multiple printing information and recording means for recording the multiple printing information set by said setting means and which can achieve multiple printing by a simple construction without causing bulkiness and increased cost.

Also, the present invention intends to provide a camera which is provided with reading means for reading the multiple printing information recorded by said recording means and control means for effecting multiple printing in conformity with the multiple printing information read by said reading means and which can achieve multiple printing by a simple construction without causing bulkiness and increased cost.

Other objects of the present invention will become apparent from the following detailed description of some specific embodiments thereof taken in conjunction with the accompanying drawings.

DESCRIPTION OF THE PREFERRED EMBODIMENTS

Figure 1:
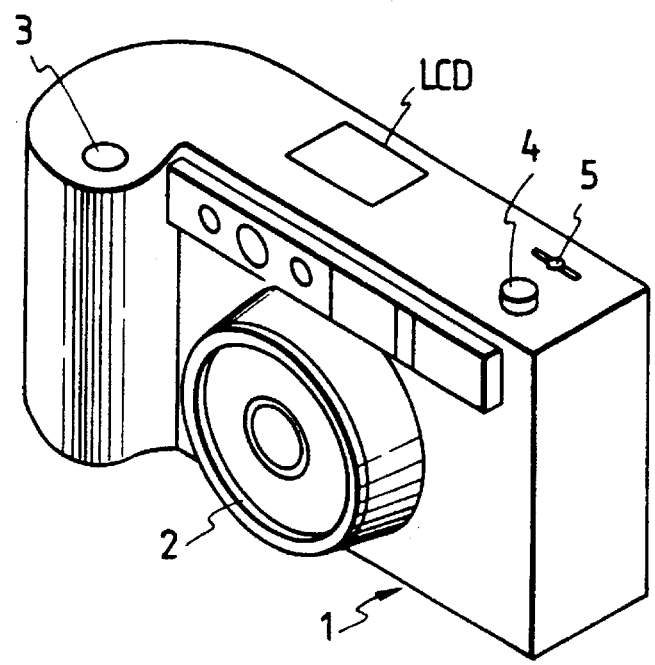
FIG. 1 is a perspective view of a camera according to an embodiment of present invention.
Figure 2:
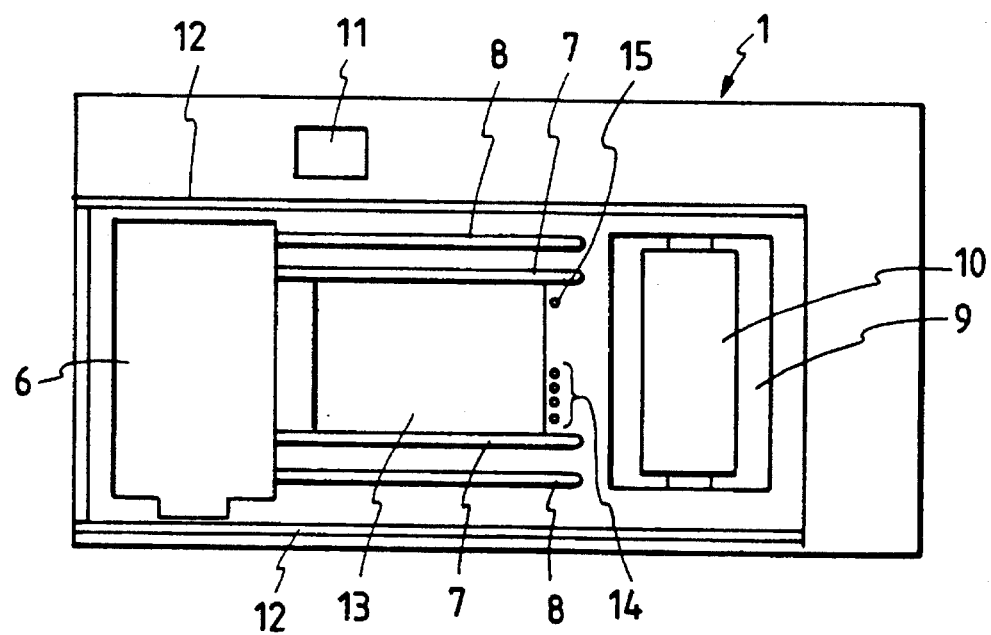
FIG. 2 is a plan view of the same camera as seen from its back.

Some embodiments of the present invention will hereinafter be described with reference to the drawings. Referring to FIG. 1 which is a perspective view of a camera used in the present invention, the reference numeral 1 designates a camera body, the reference numeral 2 denotes a photo-taking lens, the reference numeral 3 designates a release button, the reference numeral 4 denotes a multiple setting button, and the reference numeral 5 designates a cancelling button for cancelling the multiple setting. The cancelling button 5 is made small so as not to be depressed by mistake and is designed so as to be depressed, for example, by a nail. LCD denotes a liquid crystal display device for displaying various types of information regarding photographing. The liquid crystal display device LCD is disposed on the upper surface of the camera body 1. FIG. 2 is a plan view of the camera body 1 as seen from its back, and shows the camera body with a back panel removed so as to facilitate the description. In FIG. 2, the reference numeral 6 designates a cartridge chamber for containing a film cartridge therein, the reference numeral 7 denotes inner rails for controlling the position of a film in the direction of the optic axis, and the reference numeral 8 designates outer rails for controlling the position of the film in a vertical direction. The reference numeral 9 denotes a spool chamber, and the reference numeral 10 designates a film take-up spool. The reference numeral 11 denotes a finder, and the reference numeral 12 designates a back panel groove in which the back panel, not shown, is fitted. The reference numeral 13 denotes an aperture, and the reference numeral 14 designates a plurality of (in the present embodiment, four) light-emitting members provided near the aperture 13 for imprinting multiple printing-information as a code into the film. The reference numeral 15 denotes a light-emitting member for imprinting a code for cancelling the multiple printing information into the film. The light-emitting members 14 and 15 may be, for example, light-emitting diodes.

Figure 3:
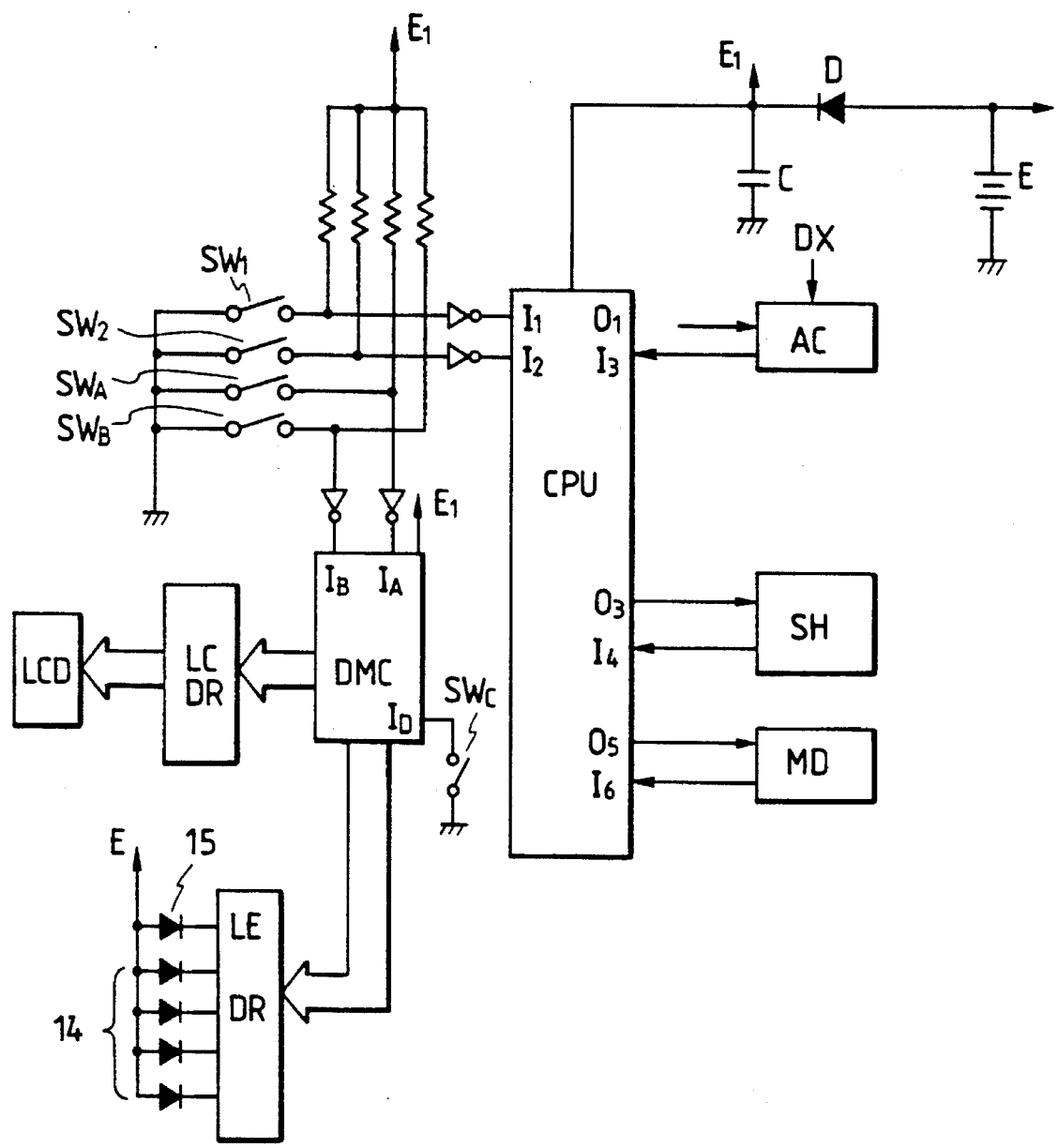
FIG. 3 is a diagram of the electrical circuit of the same camera.

The electrical circuit of the above-described camera will now be described with reference to the circuit diagram of FIG. 3. In FIG. 3, SW1 designates a photometry switch adapted to be closed by the first-stage depression of the release button 3 shown in FIG. 1, SW2 denotes a release switch adapted to be closed by the second-stage depression of the release switch 3, $SW_A$ designates a multiple switch adapted to be closed by the depression of the multiple setting button 4, and $SW_B$ denotes a cancelling switch adapted to be closed by the depression of the cancelling button 5. CPU designates a controlling microcomputer which governs the control of the camera of the present invention, and DMC denotes a displaying microcomputer for controlling the display of said liquid crystal display device LCD and controlling the code imprinted into the film with the counter function. LCDR designates a liquid crystal driving circuit for effecting the control of the liquid crystal display device LCD, and LEDR denotes an LED driving circuit for controlling the turn-on/turn-off of said plurality of light-emitting members 14 and 15.

E designates the power supply battery of the camera, and the output thereof provides a power source terminal $E_1$ stabilized through a stabilizing circuit comprising a diode D and a capacitor C, and is supplied to said controlling microcomputer CPU and said displaying microcomputer DMC. AE denotes a photometry calculation circuit. Information DX regarding the film speed prestored in the film cartridge inserted in the camera is introduced into the photometry calculation circuit AE. SH designates a shutter control circuit, and MD denotes a motor driving circuit for controlling a film winding motor, not shown.

Figure 4:
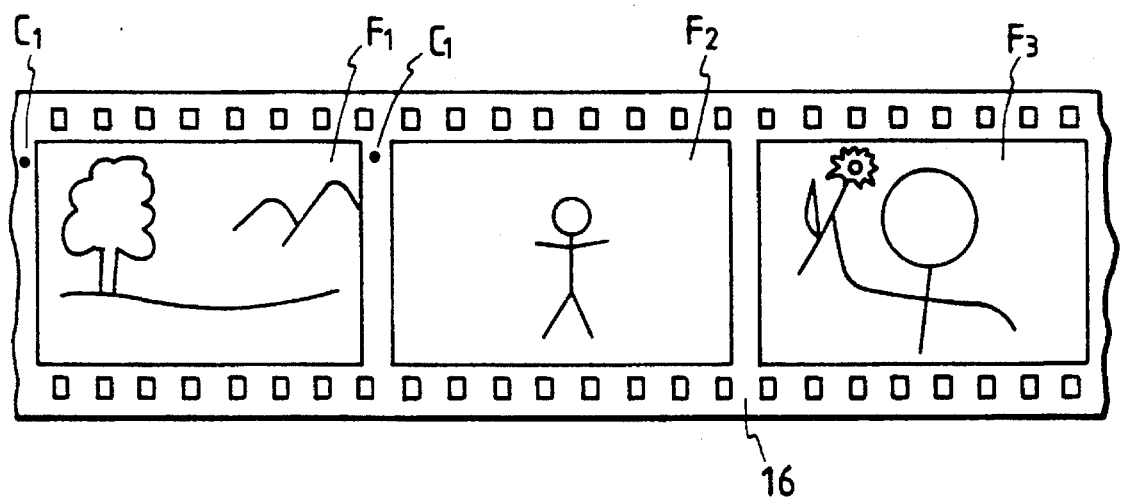
FIGS. 4 and 5 are plan views of a photographic camera photographed by the same camera.

Description will hereinafter be made of the operation when photographing is effected by the camera of the above-described construction. When multiple printing is to be designated, the multiple setting button 4 is first depressed. Thereupon, in the circuit of FIG. 3, the multiple switch $SW_A$ is closed, and for example, one of the light-emitting members 14 (in the present embodiment, the lowermost light-emitting member 14 in FIG. 2) is turned on for a moment through the displaying microcomputer DMC and the LED driving circuit LEDR. At this time, the display of PRINT or the like appears on the liquid crystal display device LCD, whereby the turn-on of the light-emitting member 14 can be confirmed. Thereupon, as shown in FIG. 4, that portion of the film 16 which is opposed to the light-emitting member 14 is exposed, and a code $C_1$ is recorded on the film 16. Thereafter, the release button 3 is depressed to close the photometry switch $SW_1$ and the release switch $SW_2$, thus effecting the photographing operation. That is, the code $C_1$ at the left of the first frame $F_1$ photographed corresponds to this frame $F_1$. Subsequently, the multiple setting button 4 is depressed with the object changed or with the composition changed for the same object by a similar operation, thereby effecting photographing again. Thereupon, the same light-emitting member 14 as that previously mentioned emits light again to the photographed second frame $F_2$, and the code $C_1$ is recorded. On the third frame $F_3$, photographing has been effected without the multiple setting button 4 being depressed but with only the release button 3 being depressed because multiple printing is not desired, and a code corresponding to this frame $F_3$ is not recorded at all.

Figure 5:
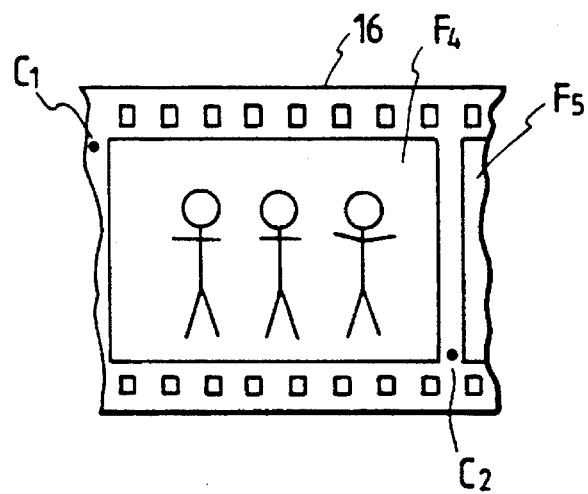

When the photographer changes his mind and desires to cancel the multiple printing information after he has effected photographing by depressing the multiple setting button 4 as previously described, he can depress the cancelling button 5 before he shifts to the next photographing operation. That is, as shown in FIG. 5, the light-emitting member 14 is turned on at a point of time whereat the multiple setting button 4 has been depressed, and the code $C_1$ is recorded on the left side of a frame $F_4$. Subsequently, the exposure of the frame $F_4$ is completed, and a motor, not shown, is driven by the motor driving circuit MD, whereby the film 16 is wound up. Thus, the next frame $F_5$ becomes opposed to the aperture 13 of the camera. When at this point of time, the cancelling button 5 is depressed by the tip or the like of a nail, the cancelling switch $SW_B$ is closed and the light-emitting member 15 is turned on for a moment. Thereupon, that portion of the film 16 which is opposed to the light-emitting member 15 is exposed, and a code $C_2$ is recorded on the film 16. Here, when the code $C_2$ has been recorded, the frame preceding it (in the present embodiment, the frame $F_4$) is designed to indicate that it is not associated with multiple printing.

Further, in the above-described embodiment, it is of course possible to effect a plurality of different multiple printings in a single film. In that case, it is necessary to make the codes different, and one of the light-emitting members may be caused to emit light at a time. An example of such a code is shown in Table 1 below, and in the present embodiment, fifteen multiple printings are made possible in a single film by 4-bit codes.

TABLE 1

| Code | Photographing Mode |
| --- | --- |
| 0000 | normal photographing |
| 0001 | multiple printing (1st time) |
| 0010 | multiple printing (2nd time) |
| 0011 | multiple printing (3rd time) |
| 0100 | multiple printing (4th time) |
| 0101 | multiple printing (5th time) |
| 0110 | multiple printing (6th time) |
| 0111 | multiple printing (7th time) |
| 1000 | multiple printing (8th time) |
| 1001 | multiple printing (9th time) |
| 1010 | multiple printing (10th time) |
| 1011 | multiple printing (11th time) |
| 1100 | multiple printing (12th time) |
| 1101 | multiple printing (13th time) |
| 1110 | multiple printing (14th time) |
| 1111 | multiple printing (15th time) |

Here, "1" shows that a light-emitting member 14 to which that bit corresponds is turned on, and "0" shows that a light-emitting member 14 to which that bit corresponds is turned off.

The operation of the circuit of FIG. 3, including what has been described above, will now be described in greater detail with reference to a flow chart regarding the displaying microcomputer DMC of FIG. 6. Here, a flow chart regarding the controlling microcomputer CPU is not shown, but this may be a known one and is therefore omitted herein for simplicity.

Figure 6:
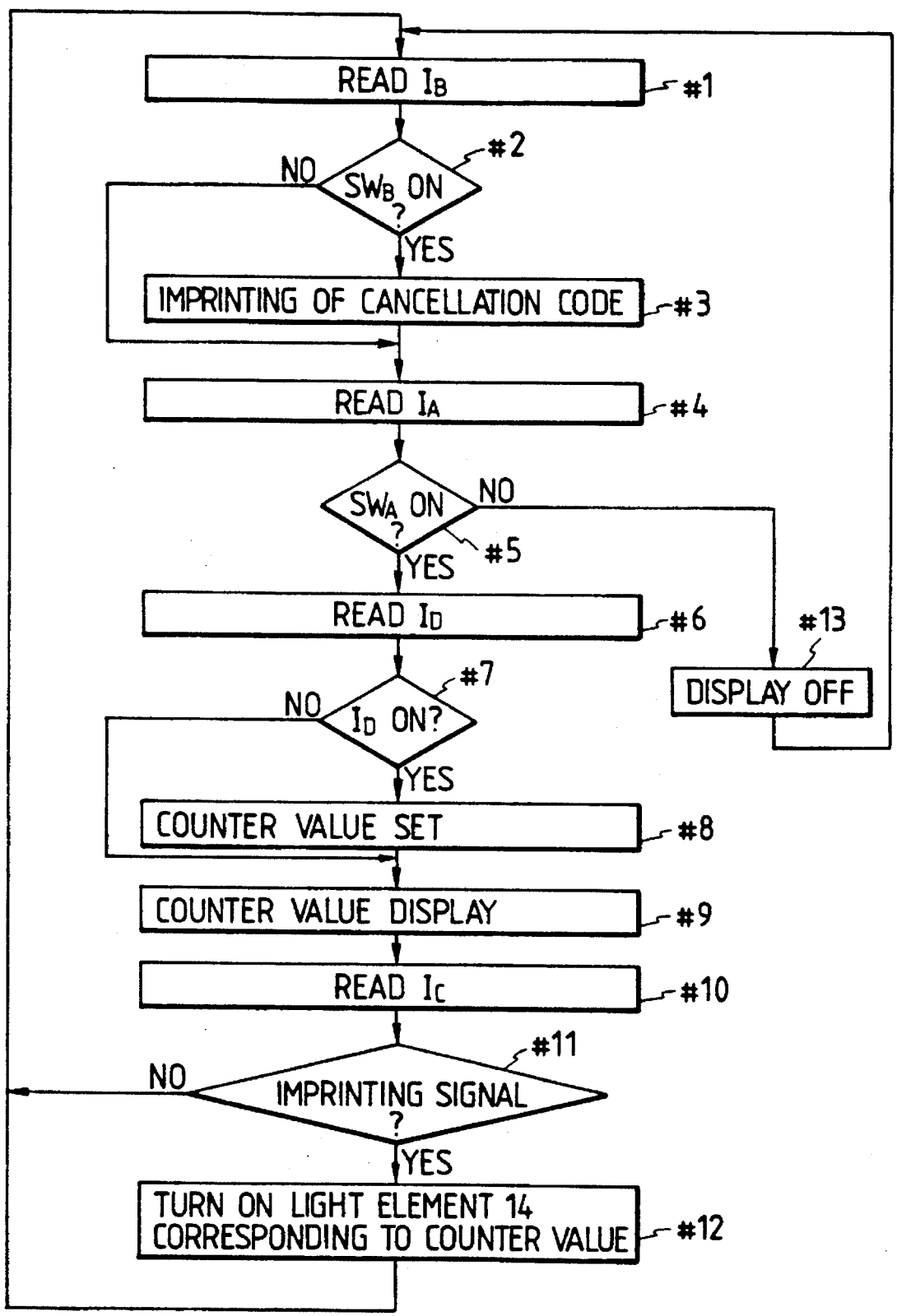
FIG. 6 is a flow chart showing the operation of the circuit of FIG. 3.

In FIGS. 3 and 6, at #1, the state of the cancelling switch $SW_B$ is first input from an input terminal $I_B$. At #2, whether the cancelling switch $SW_B$ is ON or OFF is checked, and if it is ON, advance is made to #3, where a cancellation code is imprinted into the film for a predetermined time, and advance is made to #4, and if the cancelling switch $SW_B$ is OFF, advance is directly made to #4 without the intermediary of #3. At #4, the state of the multiple switch $SW_A$ is input from an input terminal $I_A$, and at #5, whether the multiple switch $SW_A$ is ON is checked. If it is ON, the multiple mode is entered and advance is made to #6, where the state of the counter switch $SW_C$ shown in FIG. 3 is input from an input terminal $I_D$. At #7, whether this counter switch $SW_C$ is operated is judged, and if it is operated, at #8, the set counter value is re-set to a value counted up by one and advance is made to #9, and if the counter switch $SW_C$ is not operated, advance is made to #9 with the counter value unchanged. This counter value is indicative of the group of frames for which it is desired to effect multiple printing on the same printing surface, and as shown in Table 1, grouping can be done up to fifteen groups by said counter value. When said counter value is counted up by the counter switch $SW_C$ and reaches the upper limit value, it returns to the initial value and thus, the counter value can be set by being circulated in succession.

At #9, the set counter value is displayed on the display device LCD by the display driving circuit LCDR. At #10, the imprint signal from the controlling microcomputer CPU is input from an input terminal $I_C$. At #11, the presence or absence of the imprint signal is checked, and if the imprint signal is present, advance is made to #12, where any code in Table 1 which corresponds to the counter value is imprinted on the film by the light-emitting member 14, and return is made to #1. If at #11, the imprint signal is absent, return is directly made to #1. When at #5, the multiple switch $SW_A$ is not ON, that is, when the mode is not multiple photographing, advance is made to #13, where the display on the liquid crystal display device LCD by the display driving circuit LEDR is turned off, and return is made to #1 and the imprinting of codes is not effected.

Figure 7:
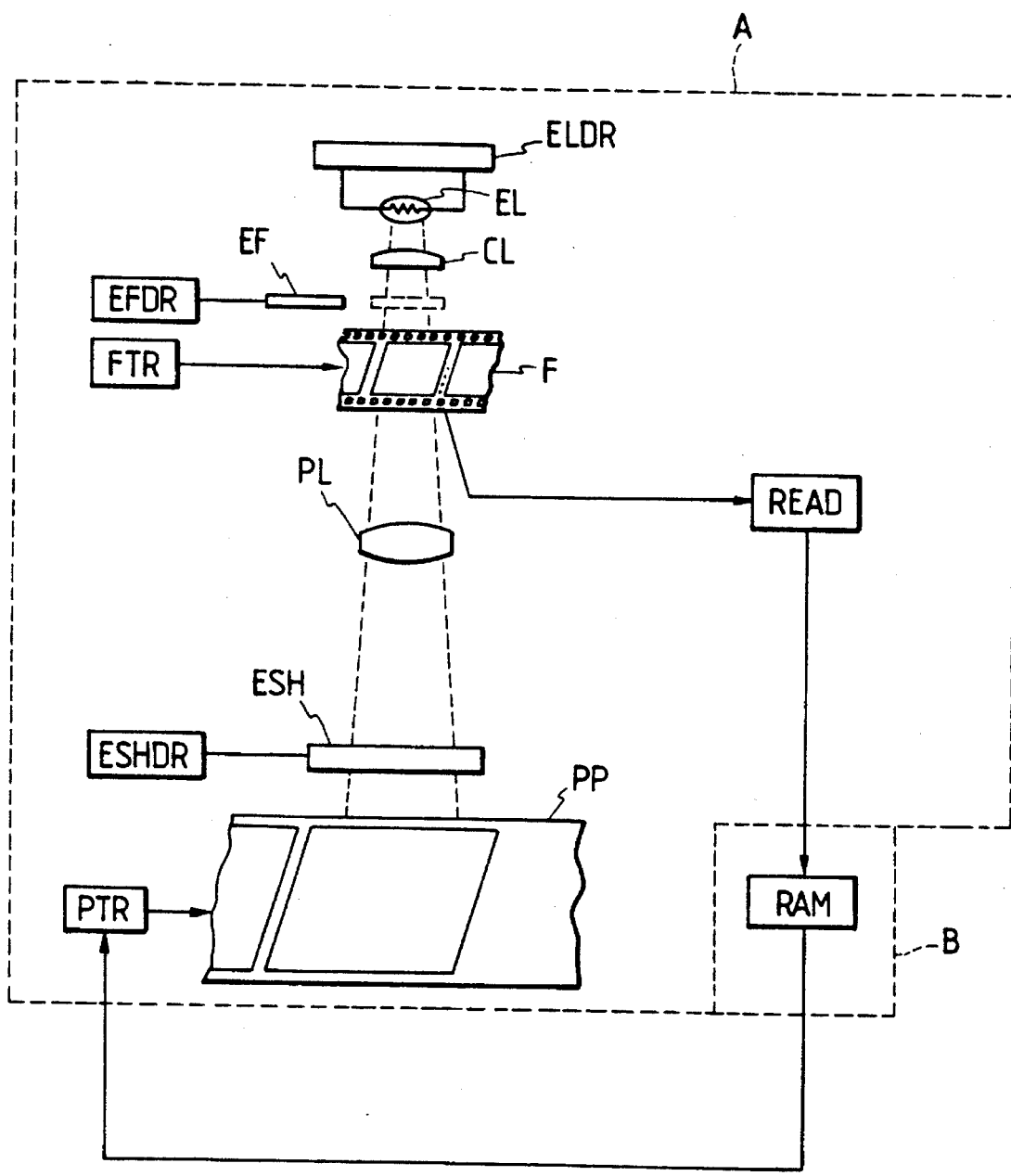
FIGS. 7 and 8 are schematic diagrams of a printing apparatus suitable for the camera of FIG. 1.

The construction of a printing apparatus suitable for the camera as described above which automatically performs the printing operation of printing the photographed film on printing paper is shown in FIG. 7. In FIG. 7, A designates a printing apparatus, and B denotes a RAM card for memorizing the codes recorded on the film. In the printing apparatus A, EL designates a printing lamp, ELDR denotes a lamp control circuit for controlling the turned-on/turned-off state of the printing lamp EL, and CL designates a condenser lens. The light emitted from the printing lamp EL is applied to a film F lying at the printing position through the condenser lens CL and a proper color filter EF. The light transmitted through the film F is projected onto printing paper PP on a roll through a printing zoom lens PL, whereby printing is effected. Also, the construction of FIG. 7 is controlled by CPU as shown in FIG. 8.

The detailed construction of this printing apparatus and the operation thereof will hereinafter be described with reference to the flow chart of FIG. 9.

Figure 8:
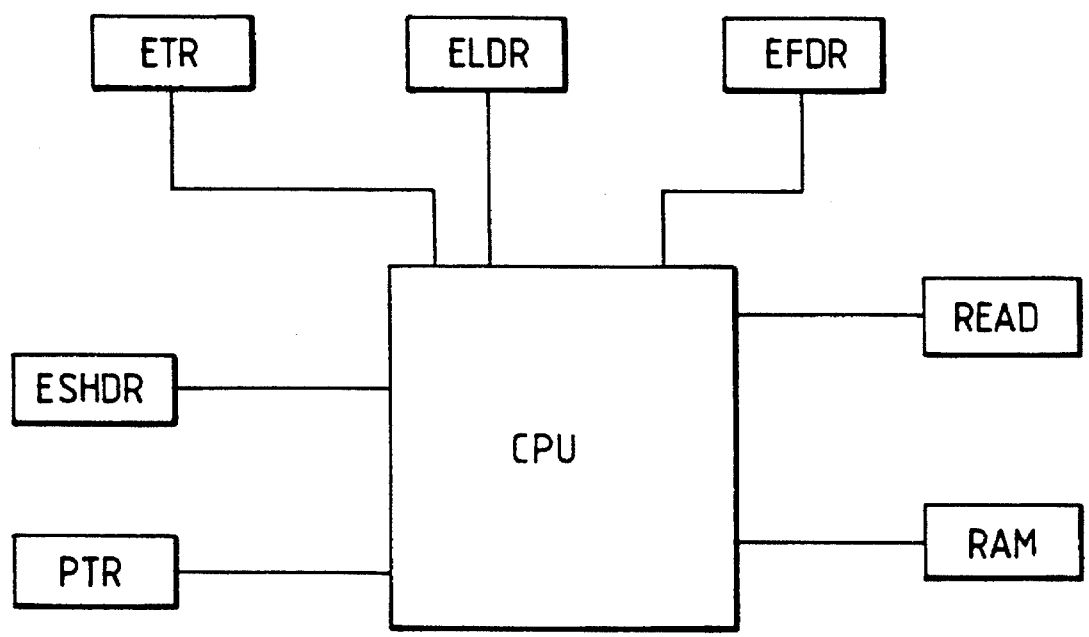
Figure 9:
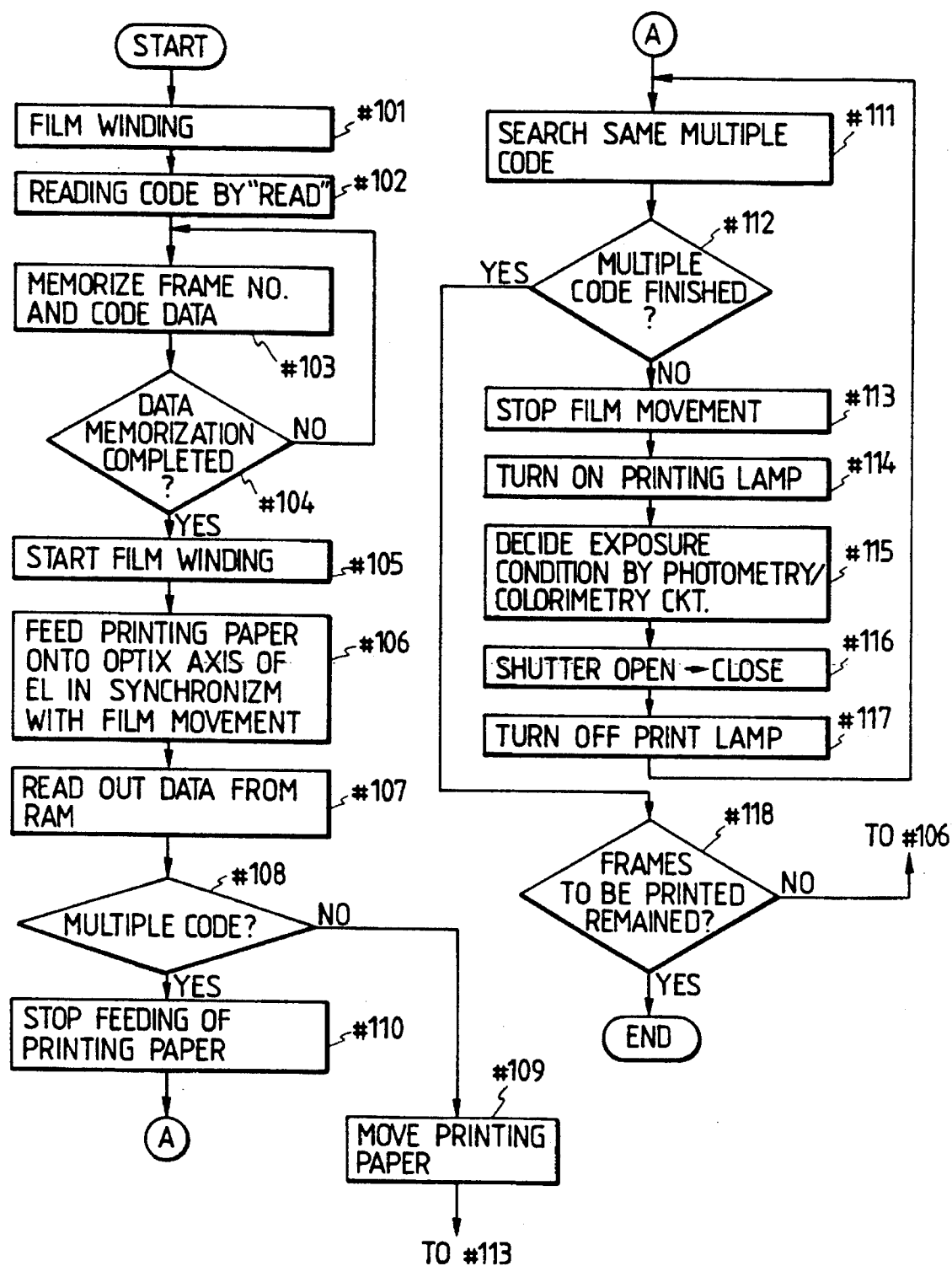
FIG. 9 is a flow chart showing the operation of the printing apparatus of FIGS. 7 and 8.

In FIGS. 7, 8 and 9, at #101, the film F is wound up by a film feeding device FTR. In the course of this winding-up, at #102, the code recorded on the film F is read by a data code reading device READ. Design is made such that when at this time, the code $C_2$ as shown in FIG. 5 has been read, the multiple information of the frame preceding it is cancelled. Subsequently, at #103, the frame number and the code data corresponding thereto are memorized into the RAM of RAM card B. At #104, whether the data memorization has been completed is confirmed, and if it is completed, advance is made to #105, where the rewinding of the film F is started, but if data memorization is not completed, return is made to #103. At #106, the printing paper PP is fed onto the optic axis of the printing lamp EL in synchronism with the movement of the film F, and design is made such that at this time, a printing paper feeding device PTR moves the printing paper PP on the roll to a proper position. Subsequently, at #107, data is read out from the RAM card B, and at #108, the presence or absence of the multiple code is confirmed, and if the multiple code is present, at #110, the feeding of the printing paper PP is stopped, and if the multiple code is absent, at #109, the printing paper PP is moved by an amount corresponding to one frame of the film F, and advance is made to #113 which will be described later. At #111, the same multiple code is searched from the data memorized in the RAM card B. This is because if the multiple code has been found out, there is one or more of the same multiple codes beside it. If at #112, there is the same multiple code, advance is made to #113, where a film having the same multiple code is set in the printing apparatus and the film F is stopped from moving, and advance is made to #114. When at #112, the same multiple code has been finished, advance is made to #118.

At #114, the printing lamp EL is turned on for a predetermined time by the lamp control circuit ELDR. At #115, the number of times of multiple printing and the exposure condition are determined by a photometry/colorimetry circuit, not shown, and at #116, a shutter ESH disposed in front of the printing paper PP is opened by a shutter control circuit ESHDR and an image is printed on the printing paper PP, and then the shutter is closed, whereby the exposure is completed. At #117, the turn-on of the printing lamp EL by the lamp control circuit ELDR is stopped, and return is made to #111, where the search as to whether there is the same multiple code is repeated.

At #118, whether the frames of the film F to be printed have been finished is confirmed, and if said frames are finished, the flow is brought to an end, and if said frames are not finished, return is made to said #106.

Figure 10:
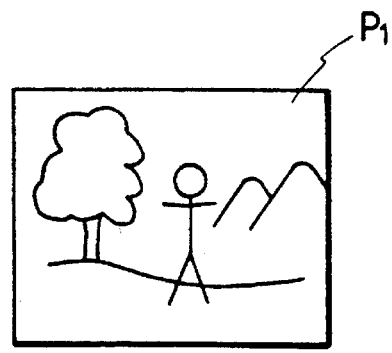
FIG. 10 is a plan view showing an example of the multiple printing by the frames $F_1$ and $F_2$ of FIG. 4.

As is apparent from the foregoing description, for example, during the printing of the frames $F_1$ and $F_2$ shown in FIG. 4, the feeding of the printing paper is once stopped and printing of a plurality of images is effected on the same printing paper. Thus, a print $P_1$ shown in FIG. 10 is obtained from said frames $F_1$ and $F_2$, and this has an effect similar to that obtained by effecting multiple photographing by the camera. At #114 in the flow chart of FIG. 9, the number of times of multiple printing is taken into account for determining the exposure condition, and this is for shortening the printing time of each frame in the case of multiple printing as compared with the case of normal printing, thereby preventing the finished print from becoming overexposed.

Another embodiment of the present invention will now be described.

Figure 11:
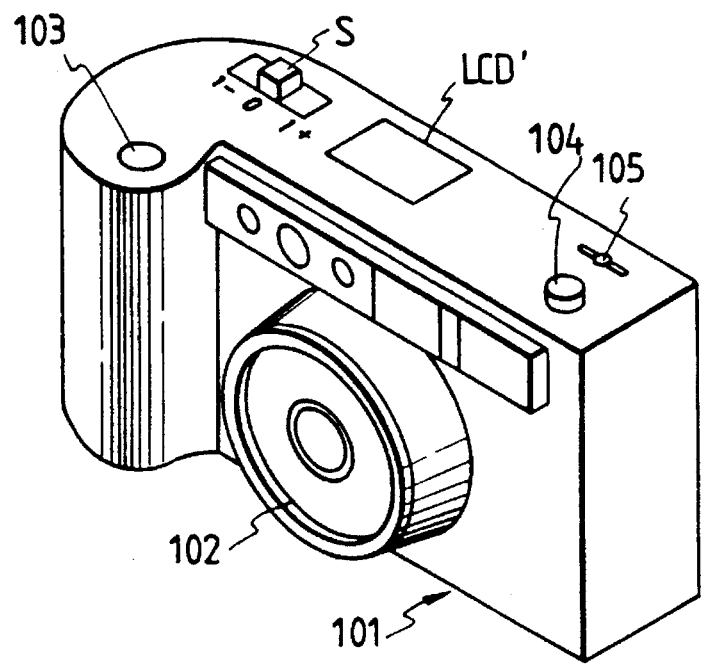
FIG. 11 is a perspective view of a camera according to another embodiment of the present invention.
Figure 12:
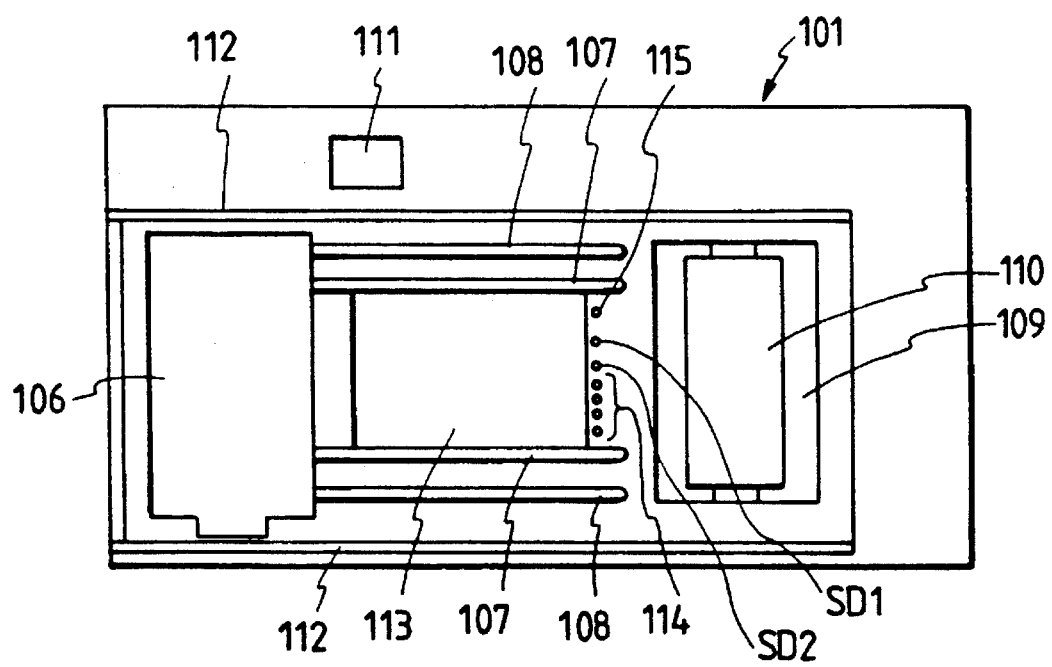
FIG. 12 is a plan view of the FIG. 11 camera as seen from its back.
Figure 13:
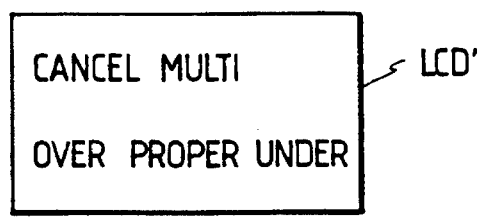
FIG. 13 is a plan view showing the fully turned-on state of the liquid crystal display device of the FIG. 11 camera.

FIG. 11 is a perspective view of a camera according to the present embodiment. In FIG. 11, the reference numeral 101 designates a camera body, the reference numeral 102 denotes a photo-taking lens, the reference numeral 103 designates a release button, the reference numeral 104 denotes a multiple setting button, and the reference numeral 105 designates a cancelling button for cancelling multiple settings. The cancelling button 105 is made small so as not to be depressed by mistake and is designed so as to be depressed, for example, by a nail. S designates a printing density selecting member. The printing density selecting member S is for excessively imparting a quantity of printing light to one of the frames to be multiple-printed during printing each time photographing is effected, in order to make said one frame to be more impressive and more conspicuous than the other frames, or conversely reducing the quantity of printing light for said one frame in order to make the frames more conspicuous, and S is a member, for selecting and setting the printing density. Divisions such as +1, 0 and −1 are formed near the printing density selecting member S, and when the printing density selecting member S is positioned at the division +1, it means that a quantity of printing light greater by +1 step than a proper quantity of printing light is imparted, and when the printing density selecting member S is positioned at the division 0, the proper quantity of printing light is imparted, and when the printing density selecting member S is positioned at the division −1, it means that a quantity of printing light smaller by 1 step than the proper quantity of printing light is imparted. LCD' designates a liquid crystal display device for displaying the information during printing. The liquid crystal display device LCD' is disposed on the upper surface of the camera body 101. FIG. 13 shows a state in which will displays are displayed. FIG. 12 is a plan view of the camera body 101 as seen from its back, and shows the camera body with its back panel removed to facilitate description. In FIG. 12, the reference numeral 106 designates a cartridge chamber for containing a film cartridge therein, the reference numeral 107 denotes inner rails for controlling the position of the film in the direction of the optic axis, and the reference numeral 108 designates outer rails for controlling the position of the film in a vertical direction. The reference numeral 109 denotes a spool chamber, and the reference numeral 110 designates a film take-up spool. The reference numeral 111 denotes a finder, and the reference numeral 112 designates a back panel groove in which a back panel, not shown, is fitted. The reference numeral 113 denotes an aperture, and the reference numeral 114 designates a plurality of (in the present embodiment, four) light-emitting members provided near the aperture 113 for imprinting multiple printing information as a code into the film. The reference numeral 115 denotes a light-emitting member for imprinting a code for cancelling the multiple printing information into the film. SD1 and SD2 designate light-emitting members adapted to emit light by the movement of a printing density selecting member S. The light-emitting members SD1 and SD2 are for imprinting the printing density as a code into the film. Such light-emitting members 114, 115, SD1 and SD2 may be, for example, light-emitting diodes.

Figure 14:
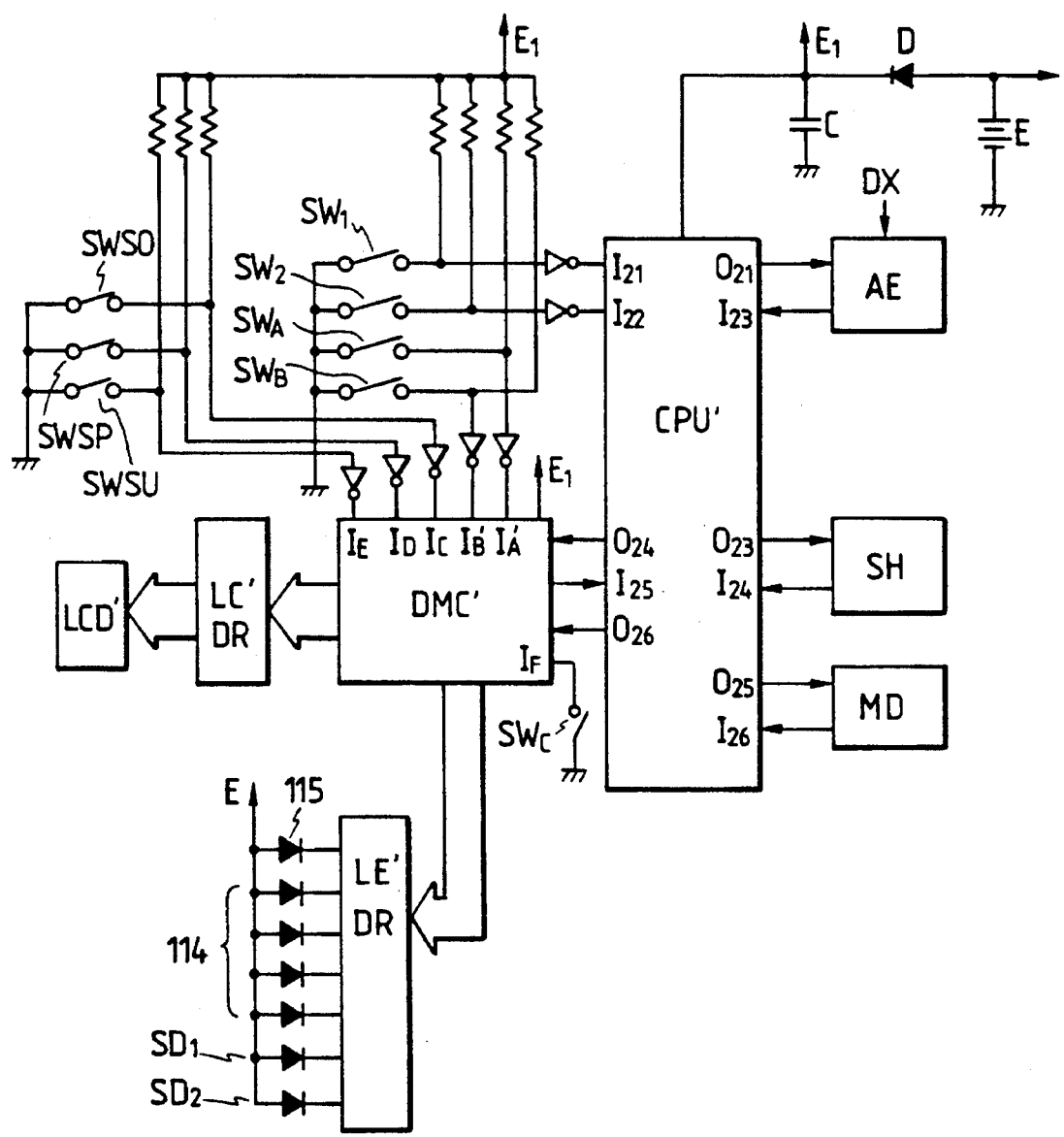
FIG. 14 is a diagram of the electrical circuit of the FIG. 11 camera.

The electrical circuit of the camera according to the present embodiment will now be described with reference to the circuit diagram of FIG. 14. In the construction of FIG. 14, members similar to those in FIG. 3 are given similar reference numerals. In FIG. 14, SW1 designates a photometry switch adapted to be closed by the first-stage depression of a shutter release button 103 shown in FIG. 13, SW2 denotes a release switch adapted to be closed by the second-stage depression of the shutter release button 103, $SW_A$ designates a multiple switch adapted to be closed by the depression of a multiple setting button 104, and $SW_B$ denotes a cancelling switch adapted to be closed by the depression of a cancelling button 105. SWSO, SWSP and SWSU designate switches adapted to be closed when the printing density selecting member S is positioned at divisions +1, 0 and −1, respectively. One of the switches SWSO, SWSP and SWSU is adapted to be selectively closed. CPU' denotes a controlling microcomputer which governs the control of the camera of the present invention, and DMC' designates a displaying microcomputer for controlling the display of the liquid crystal display device LCD' and also controlling the code imprinted into the film with the counter function. LCDR' denotes a liquid crystal driving circuit for controlling the liquid crystal display device LCD', and LCDR' designates an LED driving circuit for controlling the turn-of/turn-off of said plurality of light-emitting members 114 and 115.

E denotes the power supply battery of the camera, and the output thereof provides a power source terminal $E_1$ stabilized through a stabilizing circuit comprising a diode D and a capacitor C, and is supplied to the controlling microcomputer CPU' and the displaying microcomputer DMC'. AE designates a photometry calculation circuit. Information DX regarding the film speed pre-memorized in the film cartridge inserted in the camera is introduced into the photometry calculation circuit AE. SH denotes a shutter control, circuit, and MD designates a motor driving circuit for controlling a film winding-up motor, not shown.

Figure 15:
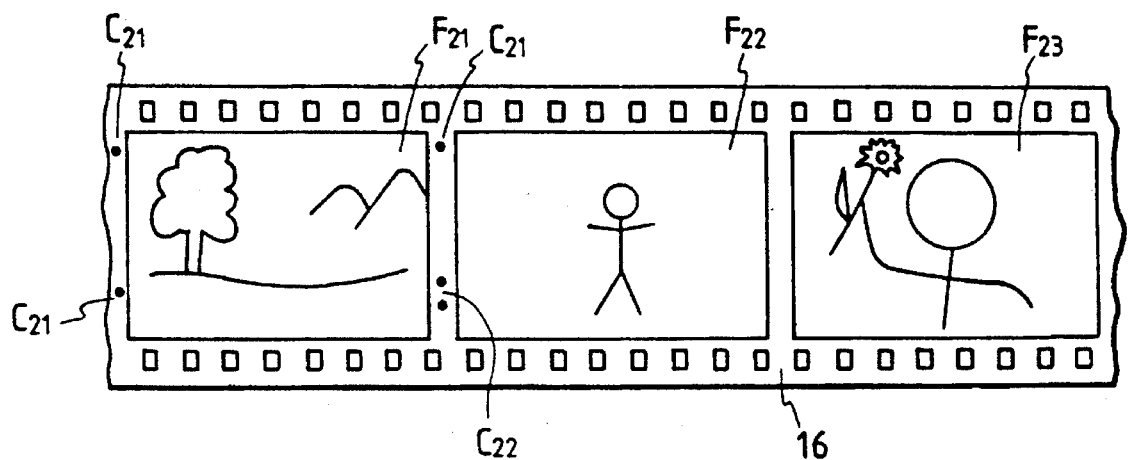
FIGS. 15 and 16 are plan views showing an example of the film photographed by the FIG. 11 camera.
Figure 18:
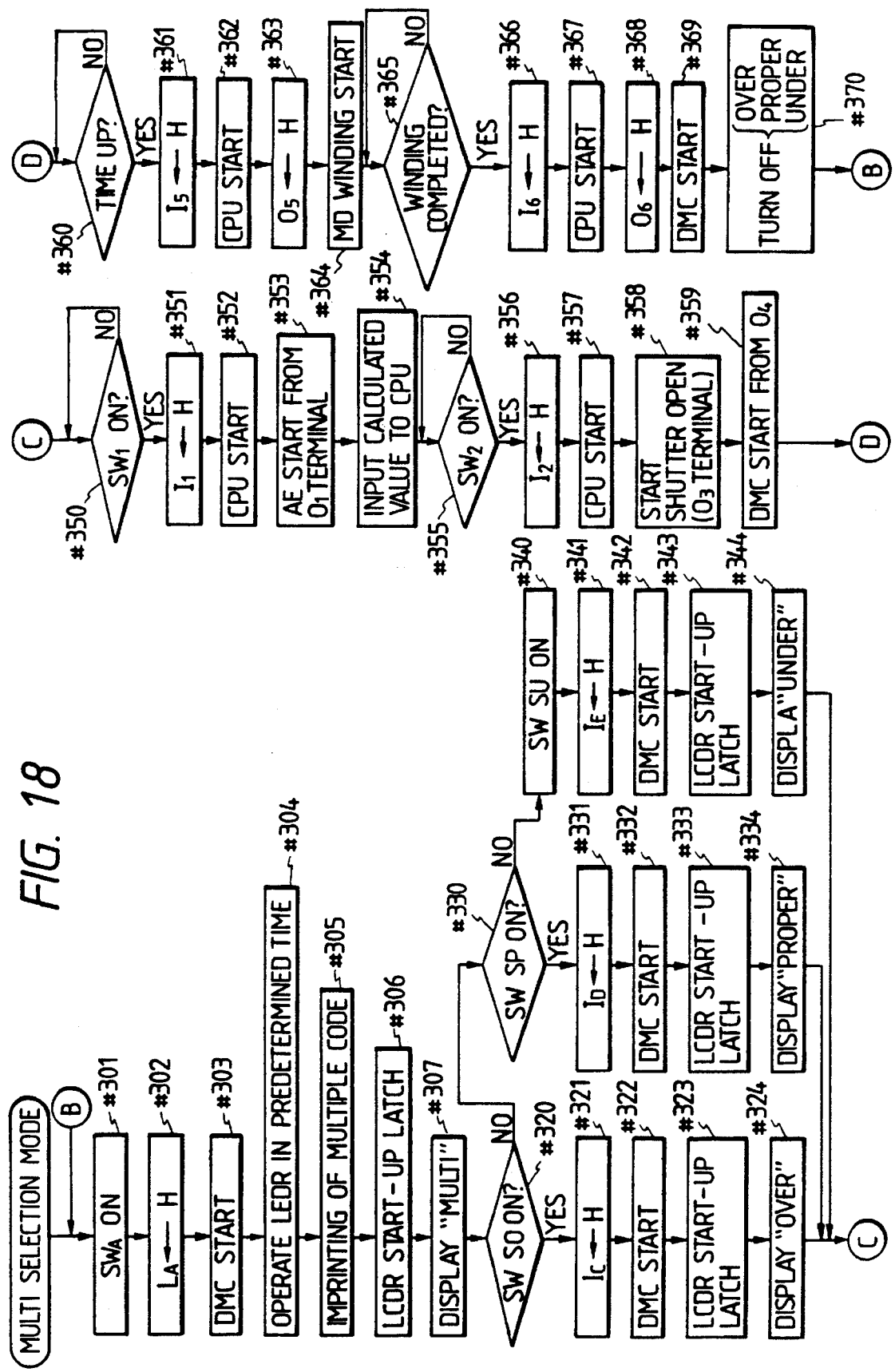
FIGS. 18 and 19 are flow charts showing the operation of the FIG. 11 camera.

The operation of effecting photographing by the camera of the above-described construction will hereinafter be described with reference to the flow chart of FIG. 18. When multiple printing is to be designated, the multiple setting button 4 is first depressed. Thereupon, in the circuit of FIG. 14, as shown at #301 of FIG. 18, the multiple switch $SW_A$ is closed, and as shown at #302–#303, the displaying microcomputer DMC' starts, and as shown at #304, for example, one of the light-emitting members 114 (in the present embodiment, the lowermost light-emitting member 114 in FIG. 12) is turned on for a predetermined time through the LED driving circuit LEDR'. At this time, as shown at #306 and #307, the liquid crystal display device LCD' starts, and as shown in FIG. 13, the display of MULTI appears, whereby it is confirmed that the light-emitting member 114 has been turned on. That is, as shown in FIG. 15, that portion of the film 116 which is opposed to the light emitting member 114 is exposed, and a code $C_{21}$ is recorded on the film 116.

Further, depending on the position of the printing density selecting member S, one of the switches SWSO, SWSP and SWSU is closed, and as shown at #320–#324, #330–#334 and #340–#344, a high level is input to one of the input terminals $I_C$, $I_D$ and $I_E$ of the displaying microcomputer DMC', and corresponding one of OVER, PROPER and UNDER is displayed on the liquid crystal display device LCD'. When the shutter release button 103 is depressed to close the photometry switch SW1 as shown at #350, a high level is input to the input terminal $I_{21}$ of the controlling microcomputer CPU' as shown at #351–#354, whereby the photometry calculation circuit AE is operated and the output value, the shutter time and the aperture value photometry-calculated thereby are input to the controlling microcomputer CPU' through the terminal $I_3$ thereof. When the shutter release button 103 is further depressed to close the release switch SW2 as shown at #355–#359, an aperture control circuit, not shown, is operated and a predetermined aperture value is reached, whereafter the shutter control circuit SH is operated through an input terminal $O_{23}$ and at the same time, starts from a terminal $O_{24}$, and light emission and display are effected by the light-emitting members SD1 and SD2 and the liquid crystal display device LCD' as shown in Table 2 below.

TABLE 2

| State of switches | | | LCD Displayed | Light-emitting members | |
|---|---|---|---|---|---|
| SWSO | SWSP | SWSU | characters | SD1 | SD2 |
| ON | OFF | OFF | OVER | Light emission | Light emission |
| OFF | ON | OFF | PROPER | Light emission | Non-light emission |
| OFF | OFF | ON | UNDER | Non-light emission | Light emission |

Figure 16:
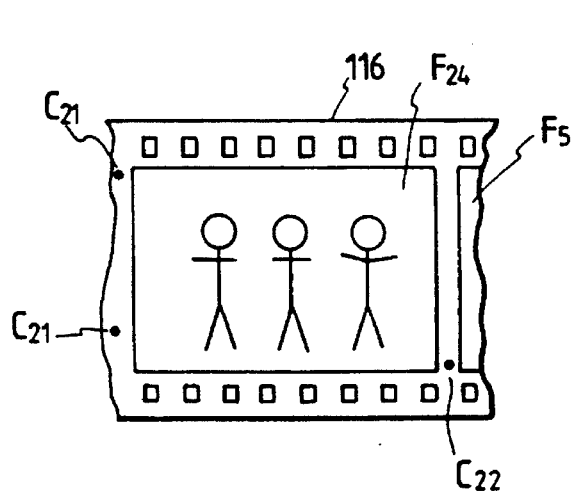

Subsequently, as shown at #360–#361, a predetermined time elapses and imprinting is completed, whereafter a high level is input as a turn-off signal to a terminal $I_{25}$, and as shown at #362–#366, the film winding-up motor control circuit MD is operated to start film winding-up and at the same time, a charge mechanism for the shutter, the mirror, etc. is operated, and after the completion of these operations, a high level is input to a terminal $I_6$, and as shown at #367–#370, the controlling microcomputer CPU' starts to thereby start the displaying microcomputer DMC' and the character OVER, PROPER and UNDER are turned off. When multiple printing is to be effected on the next frame, return is made to #301 and the same operation as that described previously is performed. FIG. 15 shows the photographed film 116, and the actual photographing operation will hereinafter be described. FIG. 16 is a view of the film as seen from the back of the emulsion surface thereof. First, the multiple setting button 104 is depressed and a code $C_{21}$ is imprinted. Next, during the shutter release, supposing a case where a person is superposed on the landscape, for example, a recollected scene of the person is printed on the landscape, the photographer imprints a code $C_{21}$ for instructing to print the landscape with a printing density one step under a power printing density so that the landscape does not abstract the person. At this time, the printing density selecting member S is positioned at the division –1. Subsequently, after film winding-up, it is assumed that the person is to be photographed on the next frame. In this case, the photographer has the intention of printing the person with a printing density greater than that for the landscape and therefore, the photographer positions the printing density selecting member S at the division +1 and imprints a code $C_{22}$ for instructing to print the person with a printing density +1 step over. The third frame $F_{23}$ is a frame on which photographing has been effected without the multiple setting button 104 being depressed but with only the release button 103 being depressed because multiple printing is not desired for this frame, and no code corresponding to this frame $F_{23}$ is recorded. In this case, the multiple setting button 104 is not depressed and therefore, if the printing density selecting member S is positioned at any of the divisions +1, 0 and –1, the printing density instructing code is not imprinted.

As the proper density during said multiple printing, where multiple printing is effected on a sheet of printing paper by the use of n frames, the time for one printing should desirably be 1/n of the time required in the case of printing using one frame.

Figure 19:
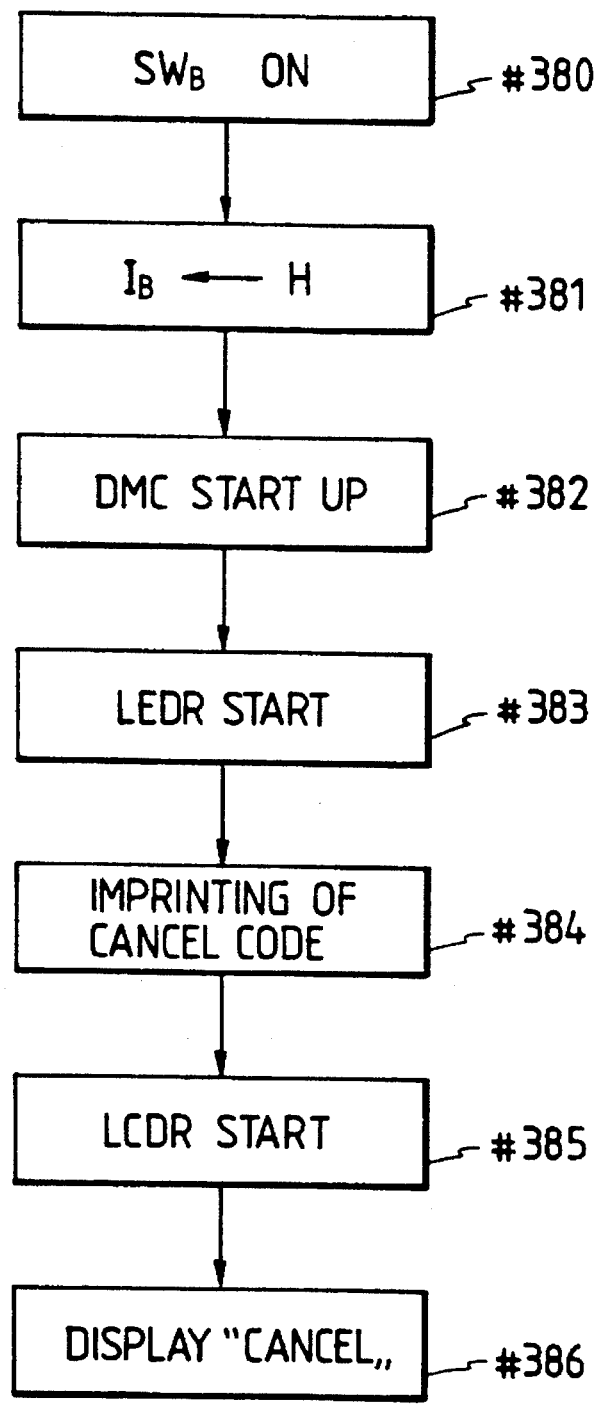

A case where multiple information is cancelled will now be described with reference to the flow chart of FIG. 19. When as previously described, the photographer changes his mind and desires to cancel the multiple information of this frame after he has depressed the multiple setting button 104 to effect photographing, he depresses the cancelling button 105 before he shifts to the next photographing operation. That is, as shown in FIG. 16, at the point of time whereat the multiple setting button 104 has been depressed, the light-emitting member 114 is turned on and a code $C_{21}$ is recorded at the left of the frame $F_4$. Subsequently, during the exposure of the frame $F_4$, a code $C_{21}$ of one-step under printing is imprinted depending on the position of the density selecting member S, and after the completion of the exposure, a motor, not shown, is driven by the motor driving circuit MD, whereby the film 116 is wound up. Thus, the next frame $F_{25}$ becomes opposed to the aperture 113 of the camera. When at this point of time, the cancelling button 105 is depressed as by the tip of a nail, the cancelling switch $SW_B$ is closed as shown at #380, and as shown at #381–#383, the displaying microcomputer DMC' starts up and the light-emitting member 115 is turned on for a predetermined time. Thereupon, that portion of the film 116 which is opposed to the light-emitting member 115 is exposed and a code $C_{22}$ is recorded on the film 116. At the same time, CANCEL is displayed on the liquid crystal display device LCD', as shown in FIG. 13. Here, design is made such that when the code $C_{22}$ has been recorded, it is indicated that the frame preceding it (in the present embodiment, the frame F4) is not associated with multiple printing.

Further, in the above-described embodiment, it is of course possible to accomplish a plurality of different multiple printings in a single film. In that case, it is necessary to make the codes different, and as previously described, the light-emitting member 114 may be selectively caused to emit light, or a plurality of light-emitting members selected may be caused to emit light at a time. An example of such a code is shown in Table 3 below, and in the present embodiment, by a 4-bit code, fifteen multiple printings are made possible in a single film.

TABLE 3

| Code | Photographing mode |
|---|---|
| 0000 | Normal photographing |
| 0001 | Multiple printing (1st time) |
| 0010 | Multiple printing (2nd time) |
| 0011 | Multiple printing (3rd time) |
| 0100 | Multiple printing (4th time) |
| 0101 | Multiple printing (5th time) |

TABLE 3-continued

| Code | Photographing mode |
| --- | --- |
| 0110 | Multiple printing (6th time) |
| 0111 | Multiple printing (7th time) |
| 1000 | Multiple printing (8th time) |
| 1001 | Multiple printing (9th time) |
| 1010 | Multiple printing (10th time) |
| 1011 | Multiple printing (11th time) |
| 1100 | Multiple printing (12th time) |
| 1101 | Multiple printing (13th time) |
| 1110 | Multiple printing (14th time) |
| 1111 | Multiple printing (15th time) |

Here, "1" shows that a light-emitting member 114 to which that bit corresponds is turned on, and "0" shows that a light-emitting member 114 to which that bit corresponds is turned off.

The operation of the circuit of FIG. 14, including what has been described above, will now be described in detail with respect discretely to the operation conformity to the flow chart of FIG. 20 regarding the controlling microcomputer CPU' and the operation conformity to the flow chart of FIG. 21 regarding the displaying microcomputer DMC'.

Figure 20:
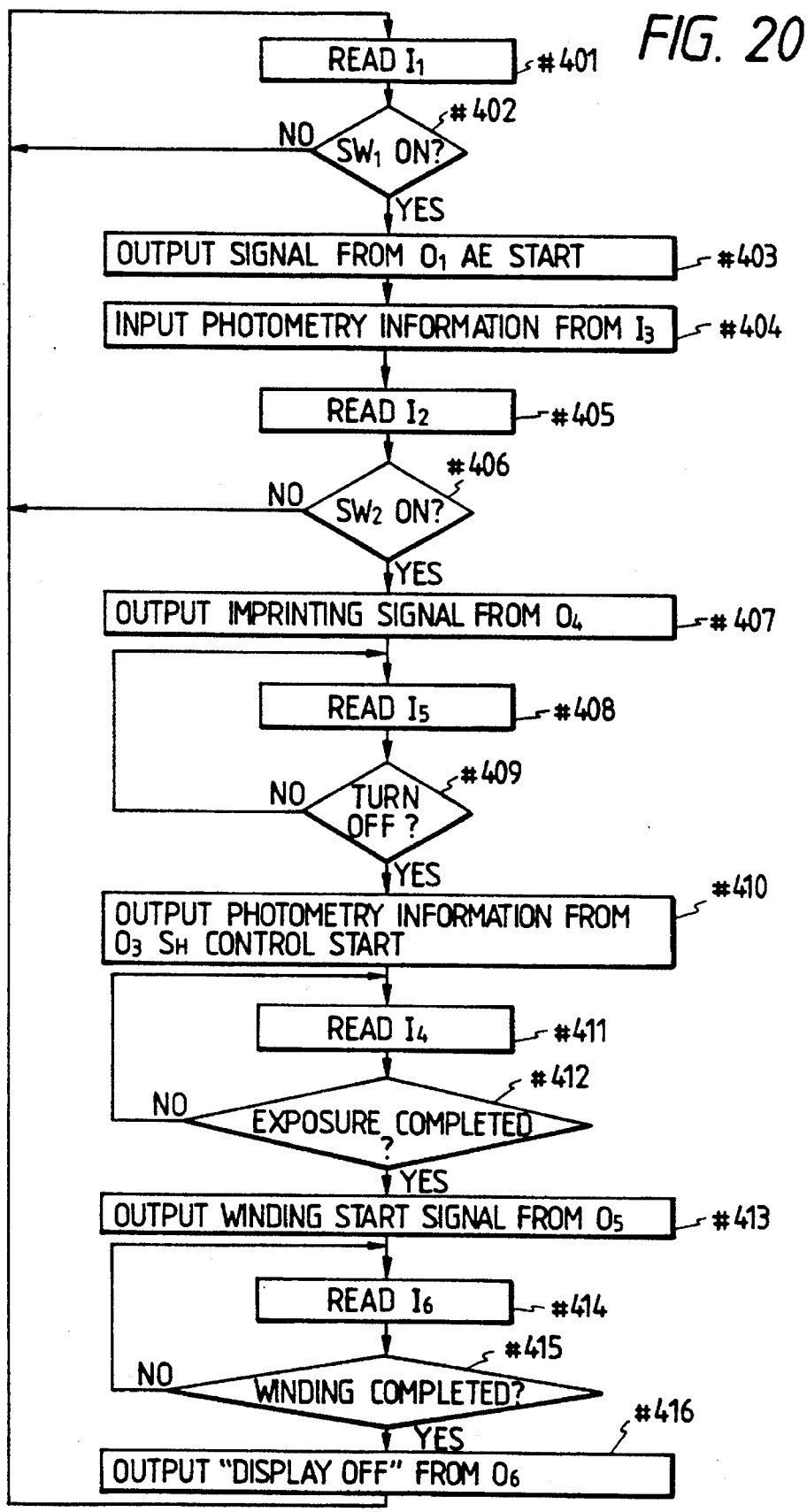
FIGS. 20 and 21 are flow charts showing the operation of the FIG. 14 circuit.

First, in FIGS. 14 and 20, at #401, the state of the photometry switch SW1 is input from an input terminal $I_{21}$, and at #402, whether the photometry switch SW1 is ON or OFF is discriminated, and if it is OFF, return is made to #401, where the operation is repeated, and if it is ON, advance is made to #403, where a photometry starting signal is sent from an output terminal $O_{21}$ to the photometry calculation circuit AE. At #404, the object luminance information measured by the photometry calculation circuit AE is input from an input terminal 123. Subsequently, at #405, the state of the release switch SW2 is input from an input terminal $I_{22}$, and at #406, whether the release switch SW2 is ON or OFF is checked, and if it is OFF, return is made to #401, and if it is ON, advance is made to #407. At #407, a code imprint starting signal is output from an output terminal $O_{24}$ to the displaying microcomputer DMC', and at #408, the imprint completion signal of the displaying microcomputer DMC' is input from an input terminal $I_{25}$, and if at #409, the imprinting is completed, advance is made to #410. At #410, the object luminance information input at #404 is sent from an output terminal $O_{23}$ to the shutter control circuit SH, and at #411, the exposure completion signal by the shutter control in the shutter control circuit SH is input from an input terminal $I_4$, and if at #412, the exposure is completed, advance is made to #413, where a winding-up start signal is output from an output terminal $O_{25}$ to the motor driving circuit MD. At #414 and #415, the winding-up completion signal from the motor driving circuit MD is checked from an input terminal $I_{21}$, and if winding-up is completed, advance is made to #416, where a signal for turning off the display is output from an output terminal $O_{26}$ to the displaying microcomputer DMC', and return is made to #401 and the sequence is repeated again. If winding-up is not completed, return is made to #414.

Figure 21:
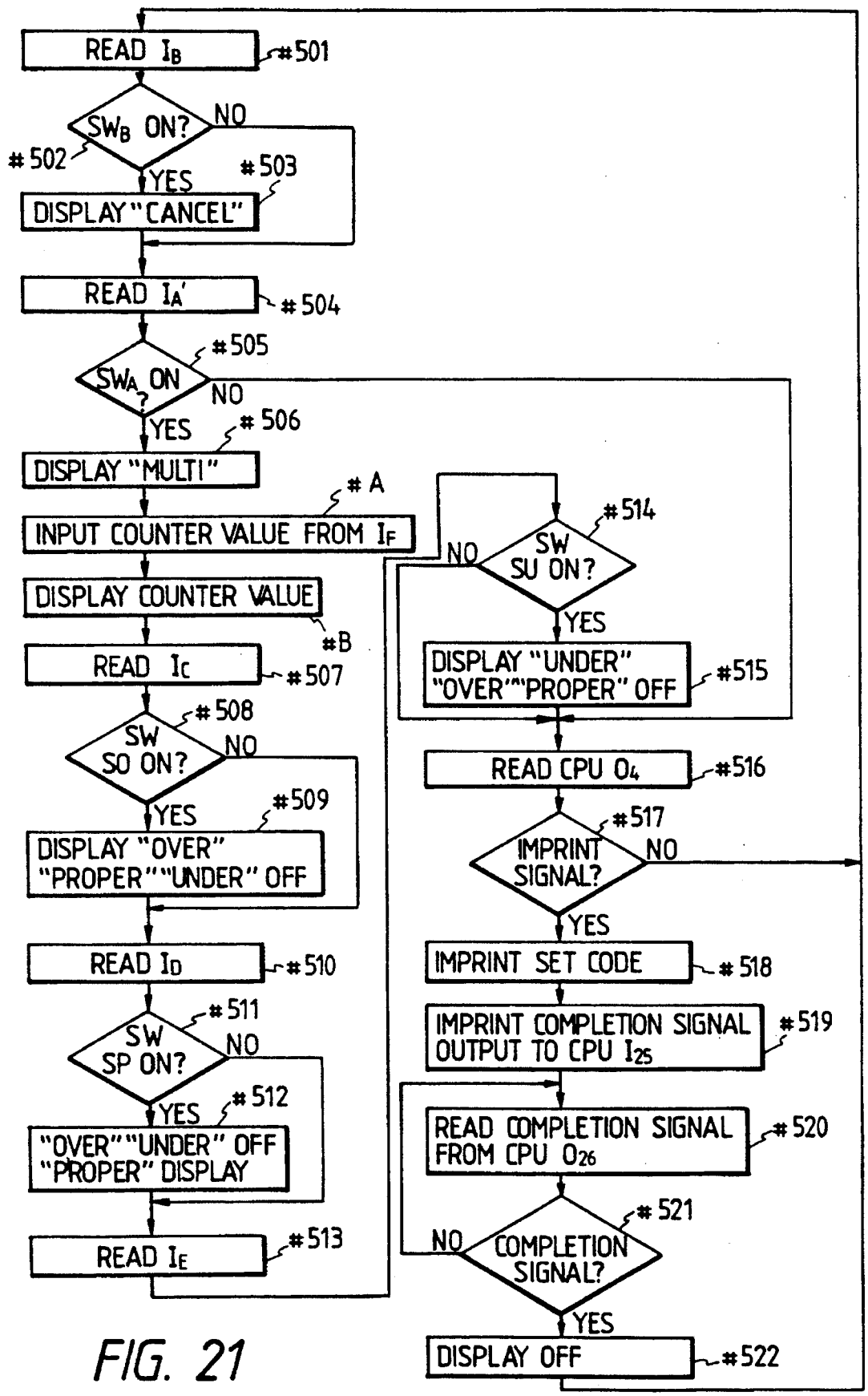

Next, in FIGS. 14 and 21, at #501, the state of the cancelling switch $SW_B$ is input from the input terminal $I_B$, and if at #502, the cancelling switch $SW_B$ is ON, at #503, an output is made to the display driving circuit LCDR' so as to display CANCEL on the liquid crystal display device LCD', and then advance is made to #504, and if the cancelling switch $SW_B$ is OFF, advance is made from #502 to #504. At #504, the state of the multiple switch $SW_A$ is input from the input terminal $I_A$, and if at #505, the multiple switch $SW_A$ is OFF, advance is made to #516, and if the multiple switch $SW_A$ is ON, at #506, a signal is output to the display driving circuit LCDR' so as to display MULTI, and advance is made to #A, on the basis of Table 3, a counter value for designating the group of frames on which multiple printing is to be effected in conformity with the ON or OFF of the multiple frame group setting switch $SW_C$ shown in FIG. 14 is set from the input terminal $I_F$.

Advance is then made to #B, where the counter value of #A is displayed on the liquid crystal display device LCD', and to what multiple printing of Table 3 it corresponds is displayed, and advance is made to #507.

At #507, the state of the switch SWSO is introduced from the input terminal $I_C$, and at #508, whether the switch SWSO is ON or OFF is discriminated. If it is ON, at #509, a signal is sent to the display driving circuit LCDR' so that OVER is displayed, and advance is made to #510, and if the switch SWSO is OFF, advance is directly made to #510 without the intermediary of #509. At #510, the state of the switch SWSP is input from the input terminal $I_D$, and at #511, whether the switch SWSP is ON or OFF is discriminated, and if it is ON, at the next #512, a signal is output to the display driving circuit LCDR' so that PROPER is displayed, and advance is made to #513, and if the switch SWSP is OFF, advance is directly made to #513 without passing through #512. At #513, the state of the switch SWSU is input from the input terminal $I_E$ and at the next #514, whether the switch SWSU is ON or OFF is discriminated, and if it is ON, at the next #515, a signal is sent to the display driving circuit LCDR' so that UNDER is displayed, and advance is made to #516, and if the switch SWSU is OFF, advance is directly made to #516. At #516, the imprint starting signal from the output terminal $O_4$ of the controlling microcomputer CPU' is input, and at the next #517, the presence or absence of the imprint starting signal is checked, and if this is present, advance is made to #518, and if this signal is absent, return is made to #501 and the above-described sequence is repeated. In the foregoing description, at #509, #512 and #515, one of OVER, PROPER, and UNDER is selectively displayed and the displays which have not been selected are turned off.

Subsequently, at #518, a signal is sent to the LED driving circuit LEDR so that codes conforming to the states of the switches $SW_B$, $SW_A$, SWSO, SWSP and SWSU are imprinted onto the film surface, and the light-emitting member is turned on for a predetermined time, whereby the codes are imprinted. Upon completion of the imprinting, advance is made to #519, where an imprint completion signal is output to the input terminal $I_{25}$ of the controlling microcomputer CPU'. At #520, the completion signal is input from the output terminal $O_{26}$ of the controlling microcomputer CPU. At the next #521, the presence or absence of the completion signal is checked, and if this signal is present, advance is made to #522, where a signal is output to the display driving circuit LCDR' to turn off the display on the liquid crystal display device LCD', whereafter return is made to #501, and if the completion signal is absent, return is made to #320.

According to the present embodiment, when a plurality of frames are to be printed on a sheet of printing paper, the printing density of the secondary picture plane can be made under relative to the primary picture plane and therefore, the primary picture plane looks more conspicuous than the secondary picture plane, and an effect conforming to the photographer's intention is displayed. Also, the respective frames during photographing are photographed sufficiently properly and therefore, independent photographs can be provided.

Another embodiment of the present invention will now be described. In the aforedescribed embodiment of FIG. 11, during the printing of the secondary image, a smaller printing density has been imparted than in the case of the primary image, whereby discrimination between the primary and the secondary picture plane has been made. In contrast, in the present embodiment, during the printing of the secondary image, instructions are given to make the point of focus out of focus. Here, the degree of out-of-focus during printing is set so as to be within the tolerance limits.

Figure 22:
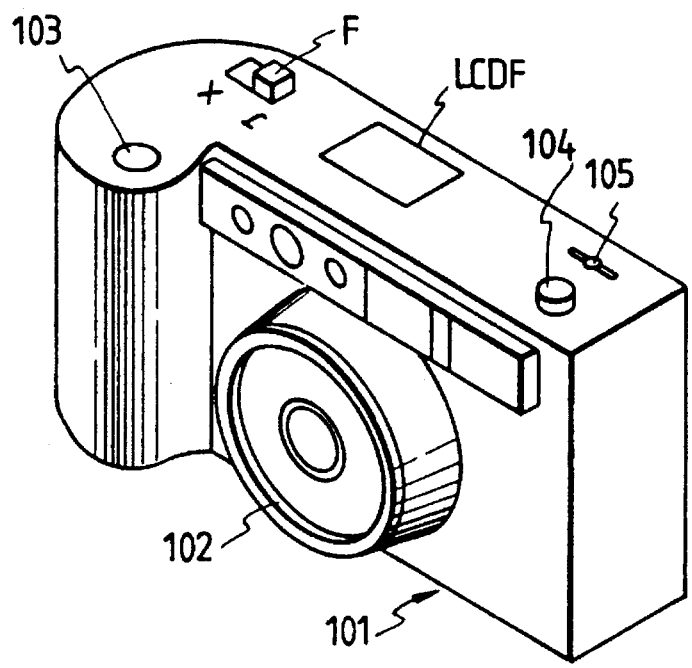
FIG. 22 is a perspective view of a camera according to still another embodiment of the present invention.
Figure 23:
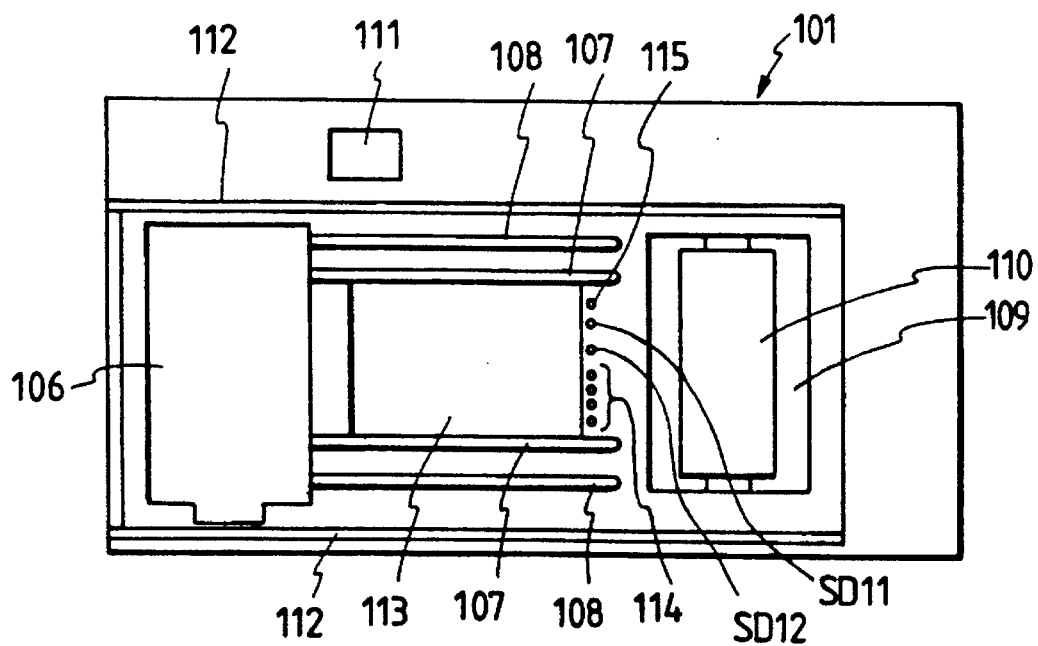
FIG. 23 is a plan view of the FIG. 22 camera as seen from its back.
Figure 24:
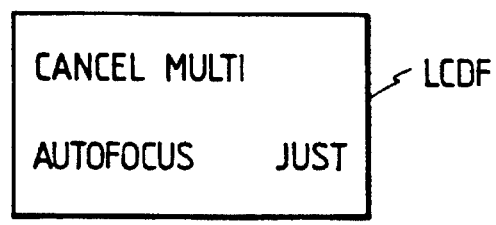
FIG. 24 is a plan view showing the fully turned-on state of the liquid crystal display device of the FIG. 22 camera.

FIG. 22 is a perspective view of a camera according to the present embodiment, and in FIG. 22, constituents similar to those in FIG. 11 are given similar reference numerals and need not be described. F designates a focus adjusting member during printing, and for example, letters J and X are printed near this member F. When the focus adjusting member F is positioned at the letter J, instructions are given to effect printing with an enlarging lens to be described being brought into an in-focus state during printing, and when the focus adjusting member F is positioned at the letter X, instructions are given to render the enlarging lens out of focus within the tolerance limits which is not in-focus. LCDF denotes a liquid crystal display device for displaying the information during printing, and a state in which all displays are done is shown in FIG. 24. FIG. 23 is a view similar to FIG. 12, and in FIG. 23, constituents similar to those in FIG. 12 are given similar reference numerals and need not be described. SD11 and SD12 designate light-emitting members adapted to be selectively caused to emit light depending on the position of the focus adjusting member F during printing. The light-emitting members SD11 and SD12 are for imprinting the degree of focus adjustment during printing as a code into the film.

Figure 25:
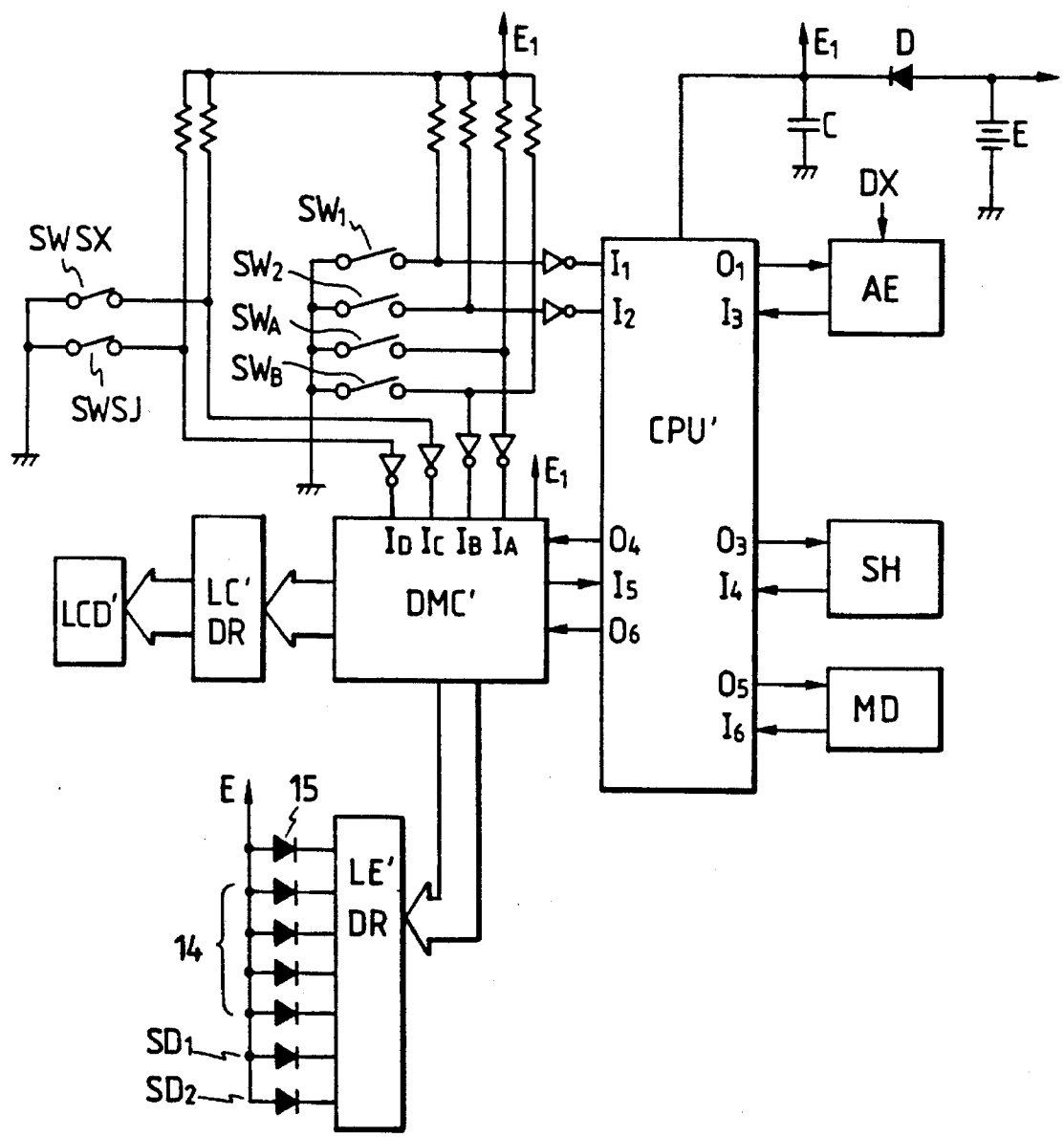
FIG. 25 is a diagram of the electrical circuit of the FIG. 22 camera.

FIG. 25 is a diagram of an electrical circuit corresponding to the present embodiment. Again in FIG. 25, constituents similar to those in FIG. 14 are given similar reference characters and need not be described. SWSJ designates a switch adapted to be closed when instructions are given to effect printing in the in-focus state when the focus adjusting member F is positioned at the letter J, and SWSX denotes a switch adapted to be closed when the focus adjusting member F is positioned at the letter X and instructions are given to effect printing in the out-of-focus state within the tolerance limits. The switches SWSJ and SWSX are designed such that only one of them is closed and the other is opened. When the switch SWSJ is closed, a high level is input to the input terminal $I_D$ of the displaying microcomputer DMC. When the release button 103 is depressed, an operation similar to that described in connection with the embodiment of FIG. 11 is performed, and further the release switch SW2 is operated and the shutter control circuit SH is operated and at the same time, the light-emitting members SD11 and SD12 and the liquid crystal display device LCDF effect light emission and display, respectively, in accordance with Table 4 below.

TABLE 4

| State of switches | | LCDF characters or display | Light-emitting members | |
|---|---|---|---|---|
| SWSJ | SWSX | | SD11 | SD12 |
| ON | OFF | JUST | Light emission | Non-light emission |
| OFF | ON | OUT FOCUS | Non-light emission | Light emission |

Figure 26:
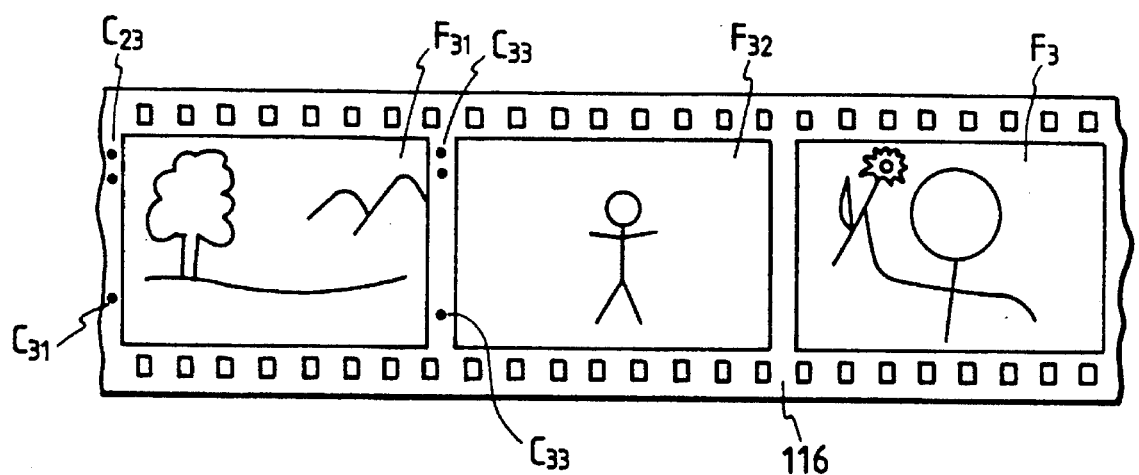
FIG. 26 is a plan view showing an example of the film photographed by the FIG. 22 camera.
Figure 27:
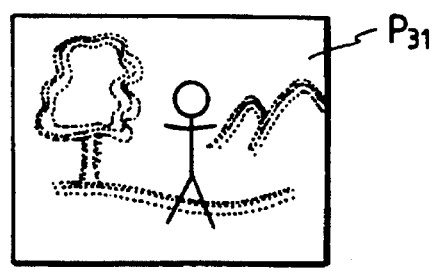
FIG. 27 is a plan view showing an example of the multiple printing by the frames $F_{11}$ and $F_{12}$ of FIG. 26.

The ensuring operation is similar to that of the aforedescribed embodiment of FIG. 11 and need not be described. FIG. 26 is a view showing the film as seen from the back of the emulsion surface thereof and. illustrating frames after being photographed. Here, as in the embodiment of FIG. 11, the landscape and a person are printed in superposed relationship with each other, and the person and the landscape are printed as the primary picture plane and the secondary picture plane, respectively, on the same printing paper. During photographing, a code $C_{31}$ for instructing to effect printing in the out-of-focus state within the tolerance limits is imprinted into a frame $F_{21}$ which is the landscape. Further, during photographing, a code $C_{32}$ for instructing to effect printing in the in-focus state is imprinted into a frame $F_{32}$ which is the person. FIG. 27 shows an example of the print $P_{31}$ in which the film 116 of FIG. 26 has been printed in accordance with the above-mentioned codes.

In the present embodiment, the code for instructing to print the secondary picture plane in the out-of-focus state has been imprinted, but if the present embodiment is combined with the method described in connection with the embodiment of FIG. 11 wherein the secondary picture plane is printed with the printing density being somewhat under the proper printing density, it will of course be more effective.

Still another embodiment of the present invention will now be described. In the aforedescribed embodiment of FIG. 22, instructions have been given to effect printing with the secondary picture plane being out of focus, whereas in the present embodiment, a filter is mounted and instructions are given to effect printing with the secondary picture plane being in a soft focus state. In the present embodiment, the out-of-focus in the embodiment of FIG. 22 is only replaced by the soft focus and therefore, detailed description of the present embodiment need not be made.

As regards the effect of the above-described embodiment, the primary picture plane is printed so as to be conspicuous relative to the secondary picture plane when multiple printing is effected, and this can reflect the photographer's intention. Further, each photographing frame is photographed properly without providing a soft effect and therefore has the effect of being capable of being used also as an independent photograph after printing. Also, if the present embodiment is combined with the embodiment of FIG. 11 and the printing density of the secondary picture plane is made under the proper density, it will of course be more effective.

Figure 28:
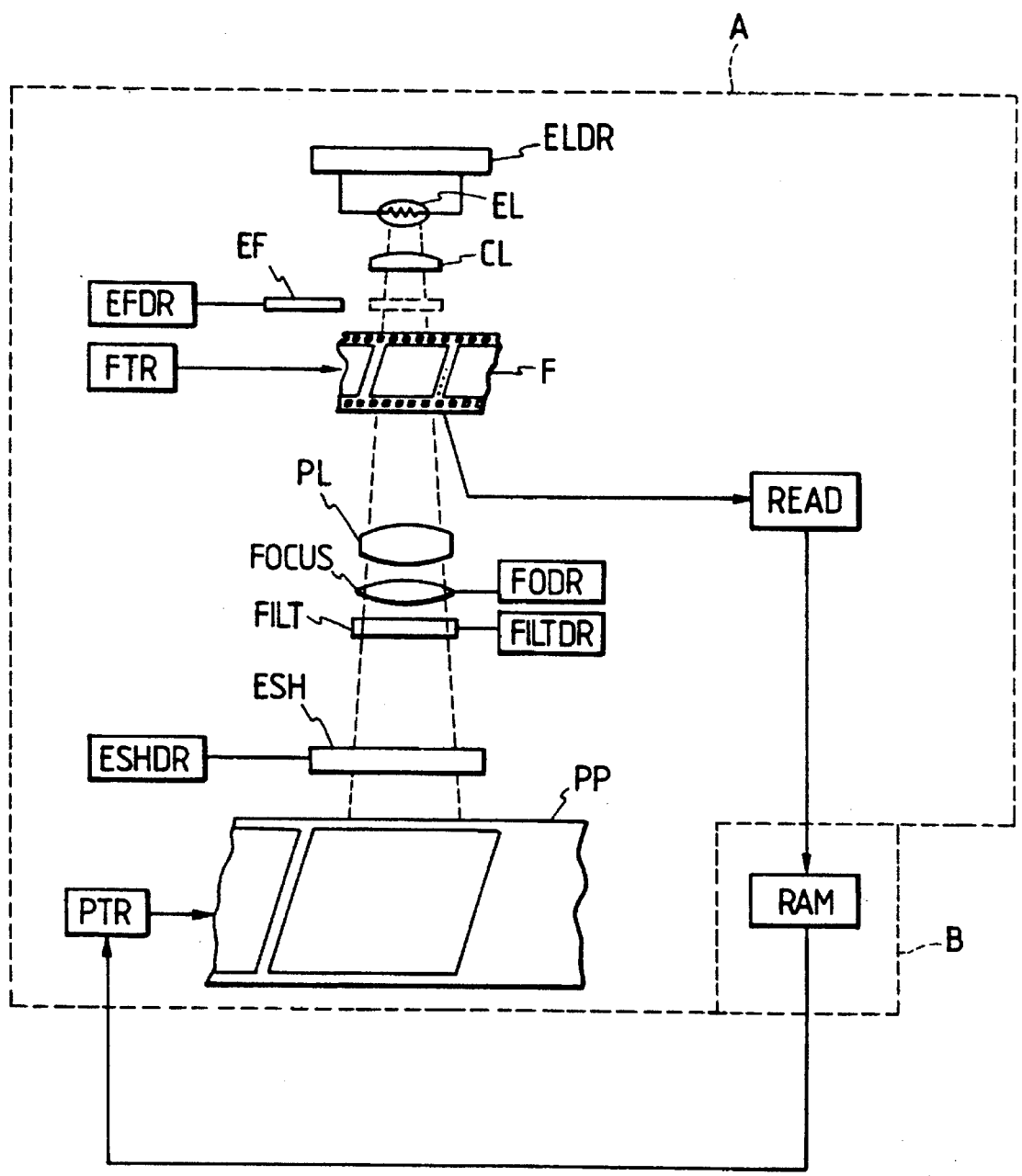
FIGS. 28 and 29 are schematic diagrams of a printing apparatus suitable for the camera of FIG. 1 or 22.

FIG. 28 shows a printing apparatus which automatically performs the operation of printing a photographed film on printing paper and which is suitable for the cameras described with reference to FIGS. 11 and so on. In FIG. 28, members similar to those in the printing apparatus of FIG. 7 are given similar reference characters. In FIG. 28, A designates the printing apparatus, and B denotes an RAM card for memorizing codes recorded on a film. In the printing apparatus A, EL designates a printing lamp, ELDR denotes a lamp control circuit for controlling the turned-on/turned-off state of the printing lamp EL and CL designates a condenser lens. The light emitted from the printing lamp EL is applied through the condenser lens CL and a proper color filter EF to a film F which is in the printing position.

PL denotes a printing zoom lens, and FOCUS designates a focusing lens whose focus position is adjusted by a conventional focus control device FODR. FILT denotes a filter whose coming into and out of the printing optical path is controlled by a conventional filter control device FILTDR.

The light transmitted through the film F is projected onto printing paper PP on a roll through the printing zoom lens PL, the focusing lens FOCUS and the filter FILT, whereby printing is accomplished.

Figure 29:
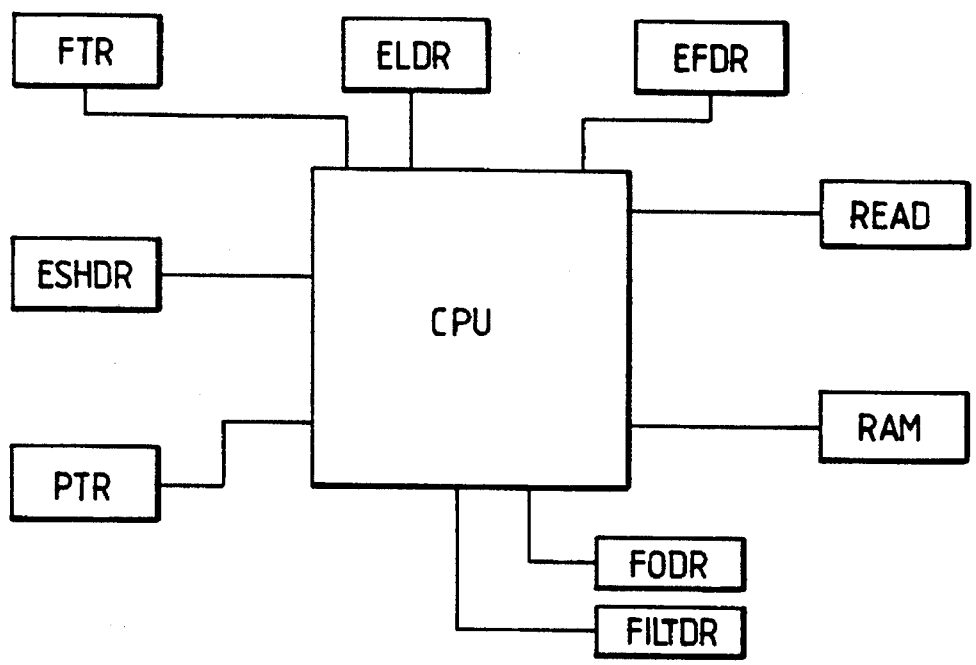

Also, the construction of FIG. 28 is controlled by a CPU as shown in FIG. 29.

The detailed construction and operation of this printing apparatus will hereinafter be described with reference to the flow chart of FIG. 30.

Figure 30B:
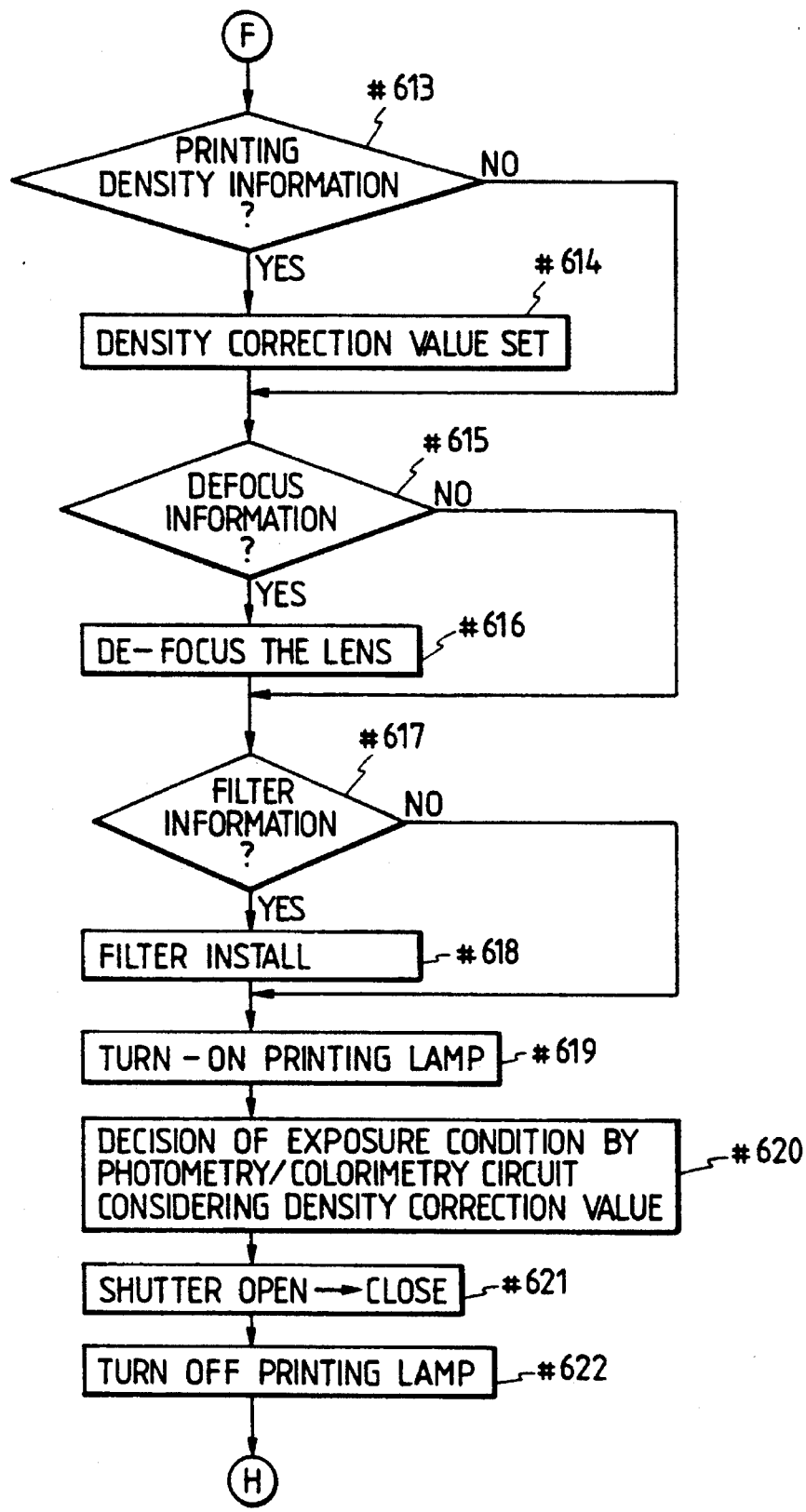
FIG. 30 is a flow chart showing the operation of the printing apparatus of FIGS. 28 and 29.
Figure 30C:
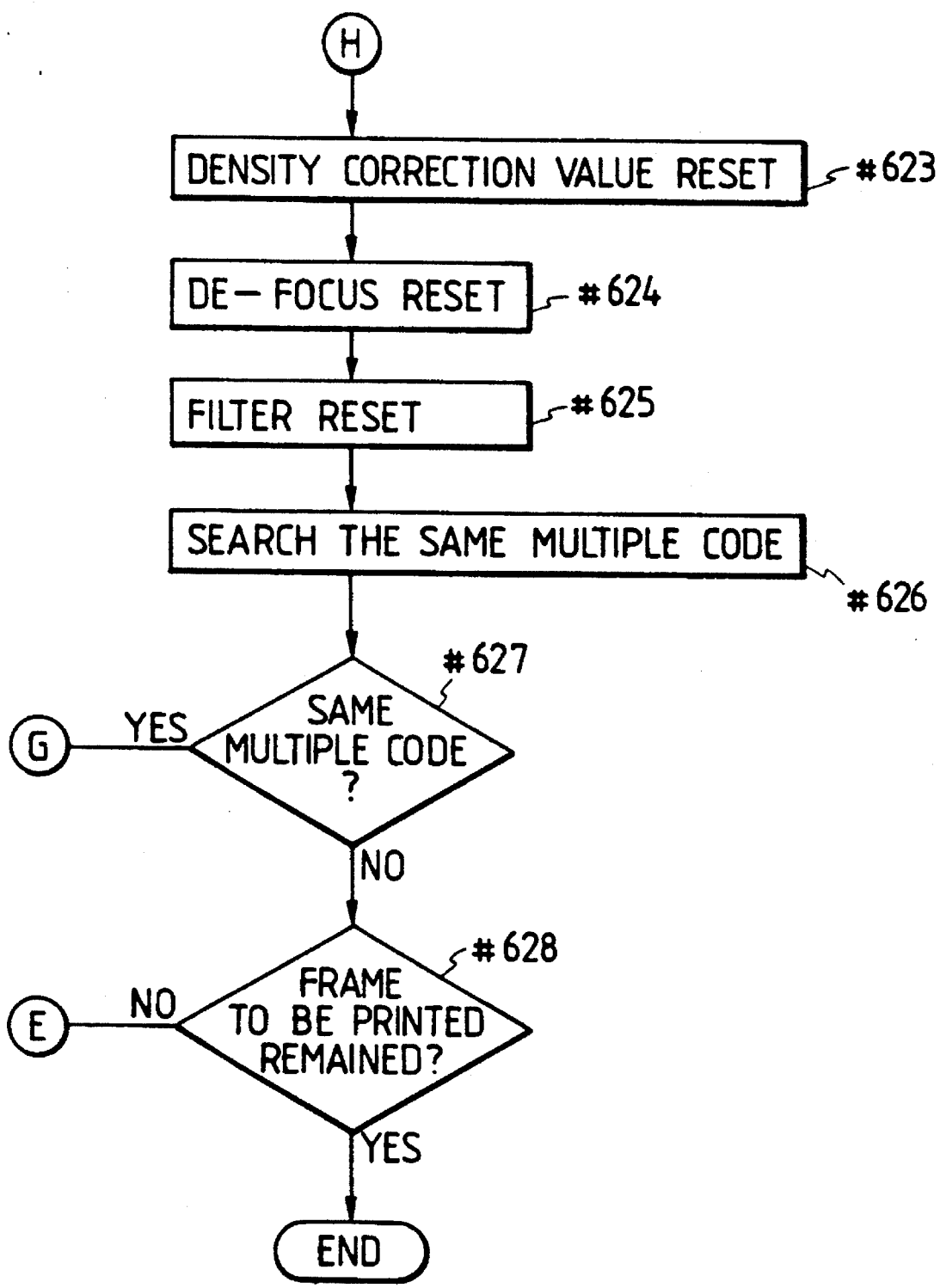

In FIGS. 28–30, at #601, the film F is wound up by the film feeding device FTR. In the course of this winding-up, at #602, codes recorded on the film F are read by the data code reading unit READ. The codes include weighting information, multiple information, cancellation information, printing density information, de-focus information, filter information, etc. Subsequently, at #603, frame numbers and corresponding code data are memorized in the RAM of the RAM card B. At #604, whether the data memorization has been completed is confirmed, and if the data memorization is completed, advance is made to #605, where the rewinding of the film F is started, and if the data memorization is not completed, return is made to #603. Subsequently, at #606, the printing paper PP is fed onto the optic axis of the printing lamp EL in synchronism with the movement of the film F, and the design is made such that at that time, the printing paper feeding device PTR moves the printing paper PP on the roll to a proper position. Subsequently, at #607, data are read out from the RAM card B, and at #608, the presence or absence of the multiple code is confirmed, and if the multiple code is present, at #610, the feeding of the printing paper PP is stopped, and if the multiple code is absent, at #609, the printing paper PP is moved by an amount corresponding to one frame of the film F, and advance is made to #612 which will be described later. At #611, the same multiple code is searched from the data memorized in the RAM card B. This is because if the multiple code has been found out, there is certainly one or more same multiple codes beside it. Next, at #612, the movement of the film $F_1$ is stopped. At #613, whether there is the correction information of the printing density is checked from the information memorized in the RAM, and if there is no such correction information, advance is made to #615, and if there is such correction information, at #614, the density correction value is set in conformity with the information of UNDER or OVER, and then advance is made to #615. At #615, whether there is de-focus information is checked, and if there is no de-focus information, advance is made to #617, and if there is de-focus information, at #616, the focusing lens is driven by the focus control device FODR and the lens is de-focused by a predetermined amount. At #617, whether there is filter information is checked, and if there is no filter information, advance is made to #619, and if there is filter information, at #618 the filter FILT is set by the filter control device FLLTDR, whereafter advance is made to #619. At #619, the printing lamp EL is turned on for a predetermined time by the lamp control circuit ELDR.

At #620, the exposure condition is determined by a photometry/colorimetry circuit, not shown, with the number of times of multiple printing and the density correction value of #614 taken into consideration.

At #621, the shutter ESH disposed in front of the printing paper PP is opened by the shutter control circuit ESHDR to thereby print an image on the printing paper PP, and then the shutter is closed, thus completing the exposure. At #622, the turn-on of the printing lamp EL by the lamp control circuit ELDR is stopped, and at #623, the density correction value is reset, and at #624, the focusing lens is reset by the focus control device FODR, whereby the lens is returned from the de-focused state to the focused state. At #625, the filter control circuit FILTDR is controlled to reset the filter FILT and retract the filter from the optical path. At #626, further the same multiple code is searched. If at #627, the same multiple code is terminated, advance is made to #628, and if the multiple code is not terminated, return is made to 612 so that the film is set for printing.

Next, at #628, whether the frame of the film F to be printed remains is confirmed, and if such frame remains, the flow is brought to an end, and if such frame does not remain, return is made to said #606.

Figure 17:
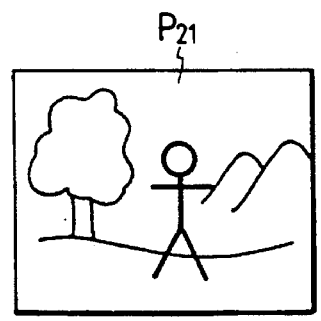
FIG. 17 is a plan view showing an example of the multiple printing by the frames $F_1$ and $F_2$ of FIG. 15.

As is apparent from the foregoing description, for example, during the printing of the frames $F_{21}$ and $F_{22}$ shown in FIG. 15 or the frames $F_{31}$ and $F_{32}$ shown in FIG. 26, the feeding of the printing paper is once stopped and a plurality of images are printed on the same printing paper. Thus, a print $P_{21}$ or $P_{31}$ shown in FIG. 17 or FIG. 27 is obtained from said frames $F_{21}$ and $F_{22}$ or $F_{31}$ and $F_{32}$, and this has an effect similar to that obtained by effecting multiple photographing by a camera.

At #620 in the flow chart of FIG. 30, the number of times of multiple printing is considered for the decision of the exposure condition, and this is for generally shortening the printing time for each frame in multiple printing as compared with ,the case of normal printing to thereby prevent the resultant print from becoming overexposed.

In the above-described printing apparatus of FIG. 7 or FIG. 28, a whole film is scanned once before printing, whereby the frame number, the multiple code and the cancellation code are recorded, and then printing is again effected in conformity with the codes. In contrast, as another method, it is possible to take data at the step preceding the printing and record the data in the RAM to thereby save the time for rewinding.

Figure 31:
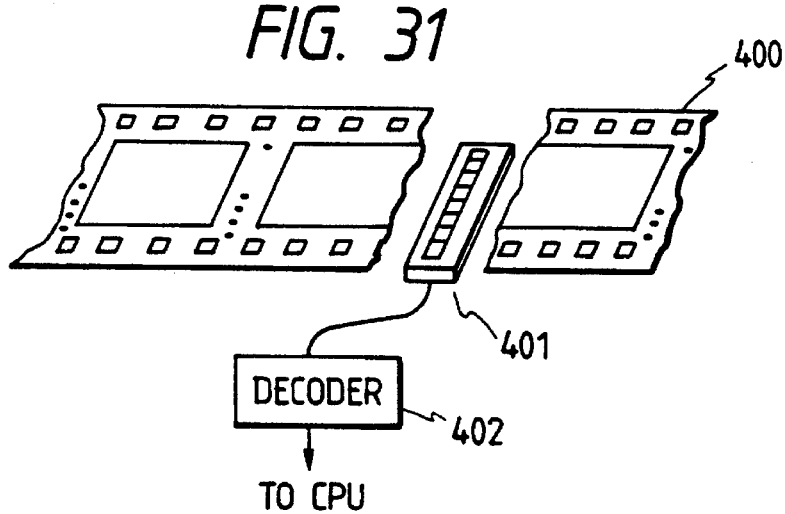
FIG. 31 shows a specific example of the READ unit of FIGS. 7 and 28.

FIG. 31 specifically shows the unit READ of FIG. 7 or FIG. 28. In FIG. 31, the reference numeral 400 designates a developed film on which codes are recorded and which is placed on a film carrier, not shown. A sensor array 401 is disposed on a portion of the film carrier, and each sensor is designed to read the recorded codes. The output of the sensor array 401 enters a decoder 402, and a multiple signal and a cancellation signal are output to the CPU. In the CPU, the frame number of the film and these signals are recorded in the RAM at a time.

Figure 32:
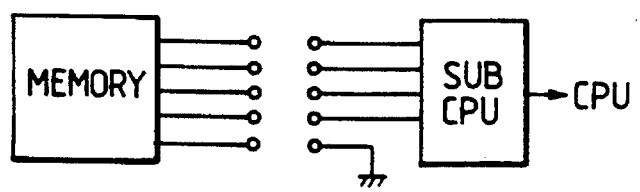
FIG. 32 shows another example of the READ unit of FIGS. 7 and 28.

FIG. 32 shown the READ unit not in the case of the aforedescribed optical recording, but in the case of a film cartridge provided with a semiconductor memory. The READ unit comprises a memory provided on the cartridge, a contact A, a contact B electrically connected to the contact A and a SUB CPU. When a command for reading the codes is obtained from the CPU, the SUB CPU accesses the memory on the cartridge, reads out the frame number and multiple information and sends them to the CPU. This is the same as scanning the data of one film in the printing apparatus of the aforedescribed embodiment.

In the cases of the printers of the types described above in order to cut the prints after printing, it suffices to store the length of the printing paper to be cut, and then in response to the cutting-length data read out, cut the printing paper after the completion of the fixing process.

In the above two embodiments of the present invention, so far light emitting means such as light-emitting diodes are flashed to record a desired size of each print, but it is to be understood that the present invention is not limited to them and that any other suitable means and methods may be used. For instance, a piece of light reflecting paper may be bonded or a magnetic medium may be used. Alternatively, the size data may be stored in an involatile storage device such as a magnetic recording medium, an EPROM, an EEPROM or the like in the form of a card which is detachably mounted on, for instance, a film cartridge.

Recording of the data into such means as described above is possible when suitable interfaces are attached to the output terminals of display microprocessor DMC.

It should be noted that, in the embodiments described above, description has been made for a camera using a film. However, it is apparent that the present invention is applicable for a camera using a magnetic recording medium, e.g. video camera and the like, or other types of cameras using various kinds of image recording media.

What is claimed is:

1. A recording apparatus for a camera, comprising:

indication means for indicating a particular plurality of image recording medium frames to be multiply printed on a common printing frame; and recording means for recording the information of said indication means, wherein said indication means comprises priority setting means for setting an order of priority in which the plurality of image recording medium frames are to be printed on the common printing frame.

2. A recording apparatus according to claim 1, wherein said priority setting means comprises means for setting an imaging effect value, whereby a higher priority image recording medium frame is printed with an imaging effect value greater than an imaging effect value of a lower priority image recording medium frame.

3. A recording apparatus for a camera, comprising:

indication means for indicating a particular plurality of image recording medium frames to be multiply printed on a common printing frame; and recording means for recording the information of said indication means, wherein said indication means comprises means for directing that a printing density be lowered.

4. A recording apparatus for a camera, comprising:

indication means for indicating a particular plurality of image recording medium frames to be multiply printed on a common printing frame; and recording means for recording the information of said indication means, wherein said indication means comprises density setting means for setting a printing density.

5. A recording apparatus according to claim 4, further comprising means for manually operating said density setting means.

6. A recording apparatus according to claim 4, further comprising means for operating said density setting means from the outside of the camera.

7. A recording apparatus for a camera, comprising:

indication means for indicating a particular plurality of image recording medium frames to be multiply printed on a common printing frame; and recording means for recording the information of said indication means, wherein said indication means comprises focus setting means for setting a printing focus.

8. A recording apparatus according to claim 7, further comprising means for manually operating said focus setting means.

9. A recording apparatus according to claim 7, further comprising means for operating said focus setting means from the outside of the camera.

10. A recording apparatus for a camera, comprising:

indication means for indicating a particular plurality of image recording medium frames to be multiply printed on a common printing frame; and recording means for recording the information of said indication means, wherein said indication means comprises filter setting means for setting that a filter is to be used during printing.

11. A recording apparatus according to claim 10, further comprising means for manually operating said filter setting means.

12. A recording apparatus according to claim 10, further comprising means for operating said filter setting means from the outside of the camera.

13. A recording apparatus for a camera, comprising:

indication means for indicating a particular plurality of image recording medium frames to be multiply printed on a common printing frame;

recording means for recording the information of said indication means, and cancelling means for cancelling an effect of information by said indication means.

14. A recording apparatus according to claim 13, wherein said cancelling means comprises optical means.

15. A recording apparatus for a camera, comprising:

indication means for indicating a particular plurality of image recording medium frames to be multiply printed on a common printing frame; and recording means for recording the information of said indication means, wherein said indication means comprises means for designating a particular plurality of image recording medium frames to be multiply printed on another common printing frame.

16. A recording apparatus for a camera, comprising:

indication means for indicating a particular plurality of image recording medium frames to be multiply printed on a common printing frame; and recording means for recording the information of said indication means, wherein said indication means comprises grouping means for directing a plurality of groups of image recording medium frames, said groups to be recorded on different common printing frames.

17. A recording apparatus according to any of claims 1, 3, 4, 7, 10, 13, 15, or 16, wherein said recording means comprises optical recording means.

18. A recording apparatus according to any of claims 1, 3, 4, 7, 10, 13, 15, or 16, wherein said recording means comprises electrical recording means.

19. A recording apparatus according to any of claims 1, 3, 4, 7, 10, 13, 15, or 16, wherein said recording means comprises magnetic recording means.

20. A recording apparatus according to any of claims 1, 3, 4, 7, 10, 13, 15, or 16, wherein said recording means comprises means for recording the information of said indication means on a member attached to an image recording medium.

21. A recording apparatus according to any of claims 1, 3, 4, 7, 10, 13, 15, or 16, wherein said recording means comprises means for imprinting the information of said indication means onto a photographic film surface.

22. A recording apparatus according to any of claims 1, 3, 4, 7, 10, 13, 15, or 16, wherein said recording means comprises means for imprinting the information of said indication means onto an area on a film outside of a film frame within which a photographic image is to be formed.

23. A recording apparatus according to any of claims 1, 3, 4, 7, 10, 13, 15, or 16, wherein said recording means comprises means for recording the information of said indication means on a photographic film.

24. A recording apparatus according to any of claims 1, 3, 4, 7, 10, 13, 15, or 16, wherein said recording means comprises means for recording the information of said indication means onto an area on a film outside of a film frame within which a photographic image is to be formed.

25. A recording apparatus according to any of claims 1, 3, 4, 7, 10, 13, 15, or 16, wherein said recording means comprises means for recording the information of said indication means on an image recording medium.

26. A recording apparatus according to any of claims 1, 3, 4, 7, 10, 13, 15, or 16, wherein said recording means comprises means for recording the information of said indication means onto an area on an image recording medium outside of an image recording medium frame within which an image is to be formed.

27. A recording apparatus according to any of claims 1, 3, 4, 7, 10, 13, 15, or 16, wherein the information of said indication means comprises coded information.

28. A recording apparatus according to any of claims 1, 3, 4, 7, 10, 13, 15, or 16, wherein said indication means comprises memory means for memorizing the information.

29. A recording apparatus according to claim 28, wherein said memory means comprises a semiconductor memory device.

30. A recording apparatus according to claim 28, wherein said memory means is provided in a photographic film cartridge.

31. A recording apparatus according to any of claims 1, 3, 4, 7, 10, 13, 15, or 16, further comprising means for manually operating said indication means.

32. A recording apparatus according to any of claims 1, 3, 4, 7, 10, 13, 15, or 16, further comprising means for operating said indication means from the outside of the camera.

33. A camera comprising:

indication means for indicating a particular plurality of image recording medium frames to be multiply printed on a common printing frame; and recording means for recording the information of said indication means, wherein said indication means comprises priority setting means for setting an order of priority in which the plurality of image recording medium frames are to be printed on the common printing frame.

34. A camera according to claim 33, wherein said priority setting means comprises means for setting an imaging effect value, whereby a higher priority image recording medium frame is printed with an imaging effect value greater than an imaging effect value of a lower priority image recording medium frame.

35. A camera comprising:

indication meads for indicating a particular plurality of image recording medium frames to be multiply printed on a common printing frame; and recording means for recording the information of said indication means, wherein said indication means comprises means for directing that a printing density be lowered.

36. A camera comprising:

indication means for indicating a particular plurality of image recording medium frames to be multiply printed on a common printing frame; and recording means for recording the information of said indication means, wherein said indication means comprises density setting means for setting a printing density.

37. A camera according to claim 36, further comprising means for manually operating said density setting means.

38. A camera according to claim 36, further comprising means for operating said density setting means from the outside of the camera.

39. A camera comprising:

indication means for indicating a particular plurality of image recording medium frames to be multiply printed on a common printing frame; and recording means for recording the information of said indication means, wherein said indication means comprises focus setting means for setting a printing focus.

40. A camera according to claim 39, further comprising means for manually operating said focus setting means.

41. A camera according to claim 39, further comprising means for operating said focus setting means from the outside of the camera.

42. A camera comprising:

indication means for indicating a particular plurality of image recording medium frames to be multiply printed on a common printing frame; and recording means for recording the information of said indication means, wherein said indication means comprises filter setting means for setting that a filter is to be used during the printing.

43. A camera according to claim 42, further comprising means for manually operating said filter setting means.

44. A camera according to claim 42, further comprising means for operating said filter setting means from the outside of the camera.

45. A camera comprising:

indication means for indicating a particular plurality of image recording medium frames to be multiply printed on a common printing frame;

recording means for recording the information of said indication means; and cancelling means for cancelling an effect of information by said indication means.

46. A camera according to claim 45, wherein said cancelling means comprises optical means.

47. A camera comprising:

indication means for indicating a particular plurality of image recordings medium frames to be multiply printed on a common printing frame; and recording means for recording the information of said indication means, wherein said indication means comprises means for designating a particular plurality of image recording medium frames to be multiply printed on another common printing frame.

48. A camera comprising:

indication means for indicating a particular plurality of image recording medium frames to be multiply printed on a common printing frame; and recording means for recording the information of said indication means, wherein said indication means comprises grouping means for directing a plurality of groups of image recording medium frames, said groups to be recorded on different common printing frames.

49. A camera according to any of claims 33, 35, 36, 39, 42, 45, 47, or 48, wherein said recording means comprises optical recording means.

50. A camera according to any of claims 33, 35, 36, 39, 42, 45, 47, or 48, wherein said recording means comprises electrical recording means.

51. A camera according to any of claims 33, 35, 36, 39, 42, 45, 47, or 48, wherein said recording means comprises magnetic recording means.

52. A camera according to any of claims 33, 35, 36, 39, 42, 45, 47, or 48, wherein said recording means comprises means for recording the information of said information means on a member attached to an image recording medium.

53. A camera according to any of claims 33, 35, 36, 39, 42, 45, 47, or 48, wherein said recording means comprises means for imprinting the information of said directing means onto a photographic film surface.

54. A camera according to any of claims 33, 35, 36, 39, 42, 45, 47, or 48, wherein said recording means comprises means for imprinting the information of said directing means onto an area on a film outside of a film frame within which a photographic image is to be formed.

55. A camera according to any of claims 33, 35, 36, 39, 42, 45, 47, or 48, wherein said recording means comprises means for recording the information of said directing means on a photographic film.

56. A camera according to any of claims 33, 35, 36, 39, 42, 45, 47, or 48, wherein said recording means comprises means for recording the information of said indication means onto an area on a film outside of a film frame within which a photographic image is to be formed.

57. A camera according to any of claims 33, 35, 36, 39, 42, 45, 47, or 48, wherein said recording means comprises means for recording the information of said indication means on an image recording medium.

58. A camera according to any of claims 33, 35, 36, 39, 42, 45, 47, or 48, wherein said recording means comprises means for recording the information of said indication means onto an area on an image recording medium outside of an image recording medium frame within which an image is to be formed.

59. A camera according to any of claims 33, 35, 36, 39, 42, 45, 47, or 48, wherein the information of said indication means comprises coded information.

60. A camera according to any of claims 33, 35, 36, 39, 42, 45, 47, or 48, wherein said indication means comprises memory means for memorizing the information.

61. A camera according to claim 60, wherein said memory means comprises a semiconductor memory device.

62. A camera according to claim 60, wherein said memory means is provided in a photographic film cartridge.

63. A camera according to any of claims 33, 35, 36, 39, 42, 45, 47, or 48, further comprising means for manually operating said indication means.

64. A camera according to any of claims 33, 35, 36, 39, 42, 45, 47, or 48, further comprising means for operating said indication means from the outside of the camera.

* * * * *

UNITED STATES PATENT AND TRADEMARK OFFICE
CERTIFICATE OF CORRECTION

PATENT NO. : 5,534,956
DATED : July 9, 1996
INVENTOR(S) : TOMONORI IWASHITA, ET AL.

It is certified that error appears in the above-indentified patent and that said Letters Patent is hereby corrected as shown below:

Column 3

Line 36, "printing-information" should read --printing information--.

Column 4

Line 65, "Table l" should read --Table 1--.

Column 7

Line 52, "will" should be deleted.

Column 9

Line 61, "abstract" should read --obstruct--.

Column 10

Line 37, "#381-#383," should read --#381 - #383,--.

Column 11

Line 33, "123." should read --$I_{23}$.--.
Line 39, "DMC';" should read --DMC,--.

UNITED STATES PATENT AND TRADEMARK OFFICE
CERTIFICATE OF CORRECTION

PATENT NO. : 5,534,956
DATED : July 9, 1996
INVENTOR(S) : TOMONORI IWASHITA, ET AL.

It is certified that error appears in the above-indentified patent and that said Letters Patent is hereby corrected as shown below:

Column 13

Tabe 4, "LCDF
characters or display" should read

--LCDF characters
or display--.

Column 14

Line 1, "and." should read --and--.

UNITED STATES PATENT AND TRADEMARK OFFICE
CERTIFICATE OF CORRECTION

PATENT NO. : 5,534,956
DATED : July 9, 1996
INVENTOR(S) : TOMONORI IWASHITA, ET AL.

It is certified that error appears in the above-indentified patent and that said Letters Patent is hereby corrected as shown below:

<u>Column 16</u>

Line 21, ", the" should read --the--.

<u>Column 20</u>

Line 48, "recordings" should read --recording--.

Signed and Sealed this

Thirty-first Day of December, 1996

Attest:

BRUCE LEHMAN

Attesting Officer　　　Commissioner of Patents and Trademarks